United States Patent [19]

Murteza

[11] 4,245,728

[45] Jan. 20, 1981

[54] DOOR MEMBER OPENING AND CLOSING APPARATUS

[75] Inventor: Riza E. Murteza, Oklahoma City, Okla.

[73] Assignee: LSB Industries, Inc., Oklahoma City, Okla.

[21] Appl. No.: 903,692

[22] Filed: May 8, 1978

Related U.S. Application Data

[63] Continuation-in-part of Ser. No. 572,613, Apr. 28, 1975, Pat. No. 4,091,900.

[51] Int. Cl.³ .................... F16D 67/00

[52] U.S. Cl. .................... 192/8 R; 192/12 R

[58] Field of Search .................... 192/8 R, 8 A, 8 C, 12 R, 192/12 A; 49/26, 361

[56] References Cited

U.S. PATENT DOCUMENTS

| | | | |
|---|---|---|---|
| 1,575,038 | 3/1926 | Clas | 192/8 R |
| 1,613,093 | 1/1927 | Gessler | 192/8 R |
| 1,946,048 | 2/1934 | Verderber | 192/8 R |
| 2,307,549 | 1/1943 | Thompson | 49/361 X |
| 2,617,506 | 11/1952 | Kuntz | 192/8 R |
| 3,000,626 | 9/1961 | Darney | 192/8 R |
| 3,051,282 | 8/1962 | Greene | 192/8 R |
| 3,335,831 | 8/1967 | Kalns | 192/8 R |
| 3,955,661 | 5/1976 | Popper et al. | 49/26 X |

*Primary Examiner*—George H. Krizmanich
*Attorney, Agent, or Firm*—Dunlap, Codding & McCarthy

[57] ABSTRACT

An improved apparatus for opening and closing door members wherein the door member is connected to an output shaft, the rotation of the output shaft opening and closing the door member. A brake drive assembly is connected to the output shaft and constructed such that a torque applied at the output shaft causes the brake drive assembly to be conditioned in the braking mode. A ball drive assembly is connected to the output shaft and constructed such that the output shaft is rotated in response to the rotation of a portion of the ball drive assembly.

26 Claims, 9 Drawing Figures

DOOR MEMBER OPENING AND CLOSING APPARATUS

CROSS-REFERENCE TO RELATED APPLICATIONS

This application in a continuation-in-part of the Applicant's co-pending application entitled "Brake Drive Apparatus", filed Apr. 28, 1975, Ser. No. 572,613, now U.S. Pat. No. 4,091,900.

BACKGROUND OF THE INVENTION

Field of the Invention

This invention relates to an improved apparatus for opening and closing door members.

DESCRIPTION OF THE PREFERRED EMBODIMENT

Figure 1:
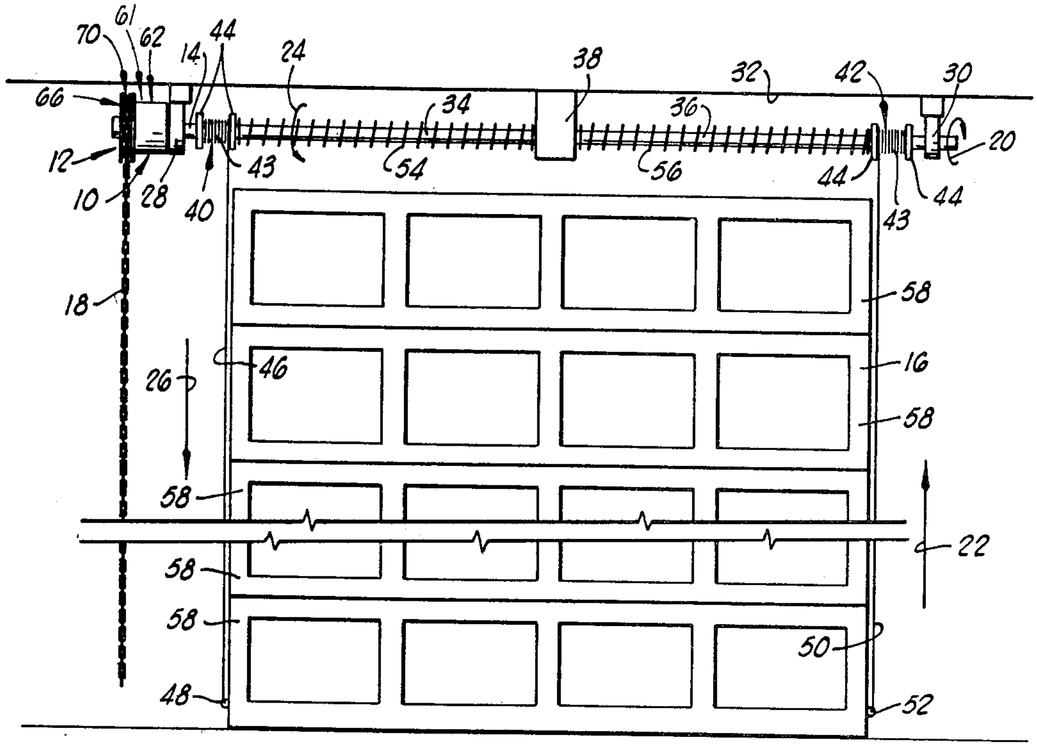
FIG. 1 is a diagrammatic, schematic view of a door member opening and closing apparatus constructed in accordance with the present invention.
Figure 2:
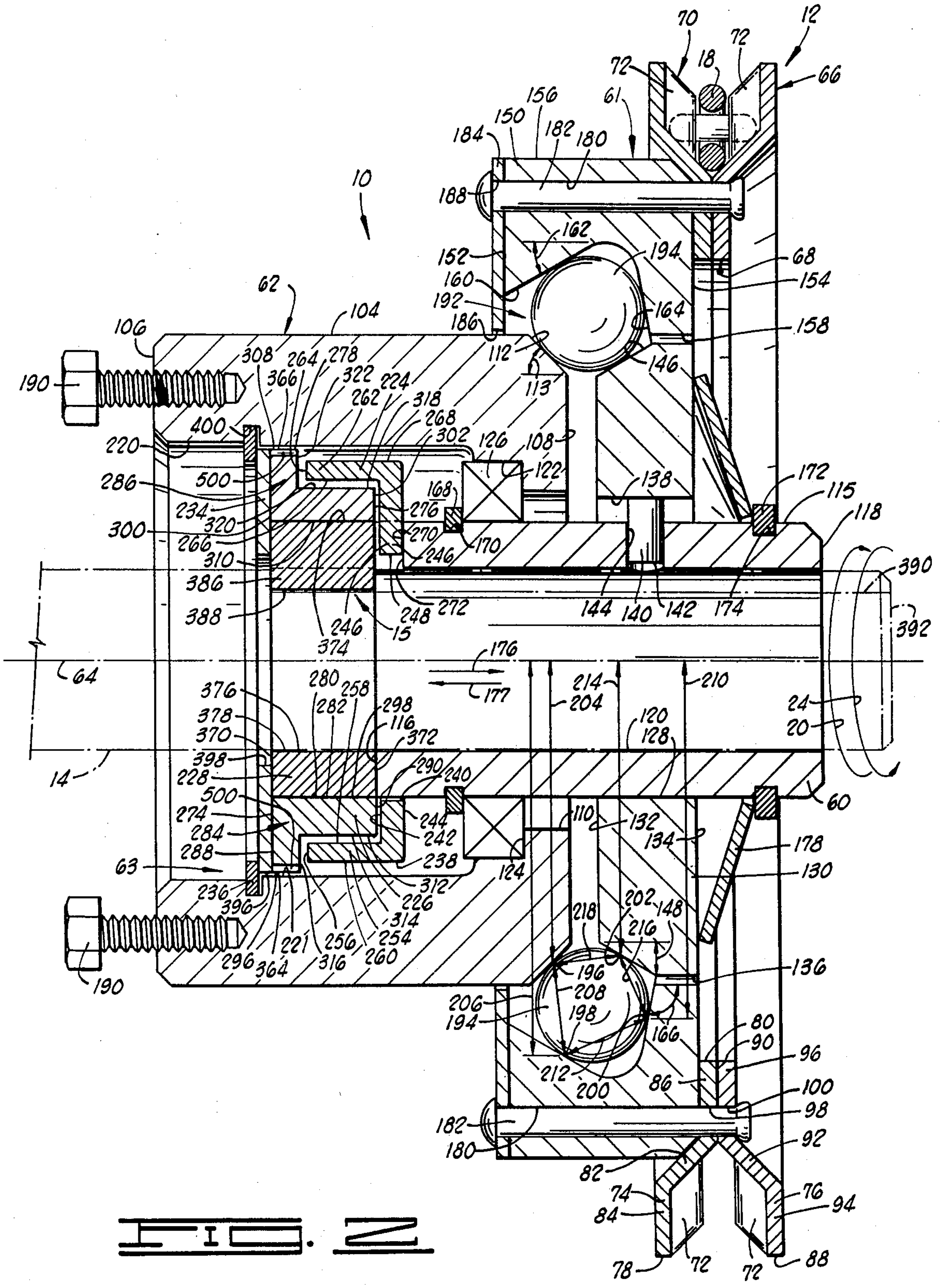
FIG. 2 is a sectional view showing the brake drive assembly and the ball drive assembly.
Figure 4:
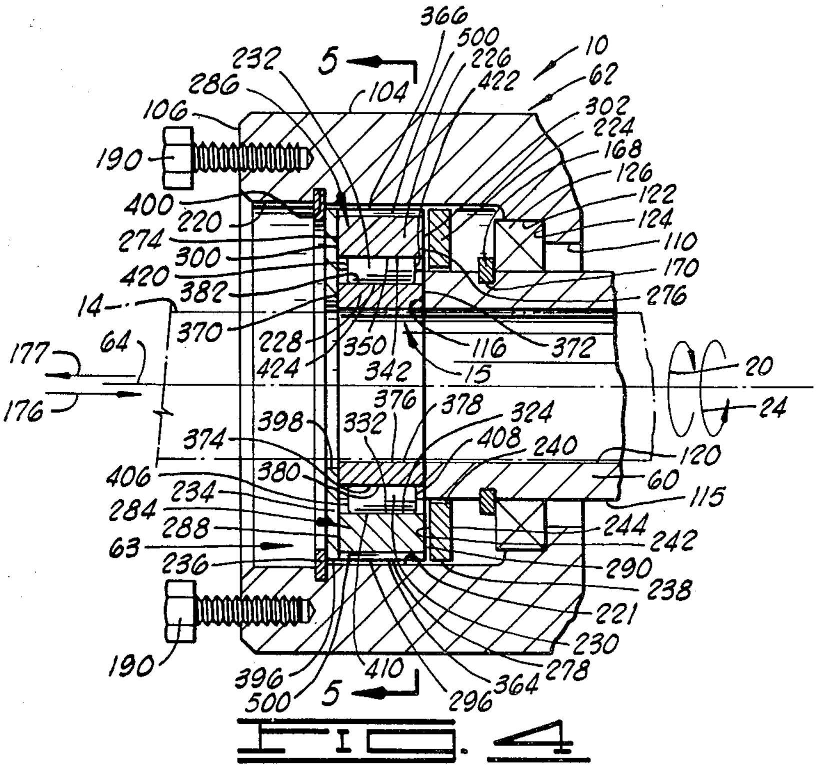
FIG. 4 is a sectional view showing a portion of the brake drive assembly of FIGS. 2 and 3.

Referring to the drawings in general, and to FIGS. 1 and 2 in particular, shown therein and designated via the general reference numeral 10 is a door member opening and closing apparatus constructed in accordance with the present invention. In general, the brake drive apparatus 10 includes an input drive assembly 12, an output shaft 14 and a brake drive assembly 15. The input drive assembly 12 is connected to the output shaft 14 such that the output shaft 14 is rotated in response to drivingly rotating the input drive assembly 12, and the brake drive assembly 15 is interposed between and connected to the input drive assembly 12 and to the output shaft 14 such that the brake drive assembly 15 is positioned in the braking mode preventing the rotation of the output shaft 14 in response to a torque applied at the output shaft 14. More particularly, the brake drive assembly 15 is constructed and connected to the input drive assembly 12 and the output shaft 14 such that the output shaft 14 cannot be rotated by applying a torque at the output shaft 14 and such that the output shaft 14 cannot be rotated by applying a torque at the output shaft 14 even though the input drive assembly 12 continues to be drivingly rotated since the brake drive assembly 15 is positioned in the braking mode in response to a torque applied at the output shaft 14.

As shown in FIG. 1, the apparatus 10 is connected to a door member 16 and utilized for opening and closing the door member 16. In this embodiment, the input drive assembly 12 includes an endless drive chain 18 for drivingly rotating the input drive assembly 12 in a first driving direction 20 causing the output shaft 14 to be rotated in the first direction of rotation 20 for moving the door member 16 in an opening direction 22 and for drivingly rotating the input drive assembly 12 in a second driving direction 24 causing the output shaft 14 to be rotated in the second direction of rotation 24 for moving the door member in a closing direction 26. The brake drive assembly 15 is positioned in the braking mode in response to a force applied on the door member 16 in either the opening direction 22 or the closing direction 26, a force applied on the door member 16 in the opening direction 22 resulting in a torque applied at the output shaft 14 in the first direction of rotation 20 and a force applied on the door member 16 in the closing direction 26 resulting in a torque applied at the output shaft 14 in the second direction of rotation 24. Thus, the apparatus 10 provides a drive apparatus for opening and closing door members wherein the door member is positionable in various park positions, generally between a fully opened position and a fully closed position, such that the door member cannot be moved from the park position by applying a force on the door member and wherein the drive apparatus is automatically positioned in the braking mode in response to a force applied on the door member even though the input drive assembly 12 continues to be rotatingly driven. Further, since the brake drive assembly 15 is positioned in the braking mode in response to a torque applied at the output shaft 14, the door member 16 cannot be slammed closed and the door member 16 cannot be driven in the opening direction 22 beyond a fully opened position.

The output shaft 14 extends a distance from the brake drive assembly 15. The output shaft 14 is journally supported in a generally horizontally extending position via a pair of spaced journal supports 28 and 30, each of the journal supports 28 and 30 being secured to a support surface 32 and a portion of the output shaft 14 extending through and being journally supported via each of the journal supports 28 and 30. The output shaft 14, more particularly, includes a first door shaft 34 and a second door shaft 36, one end of each of the door shafts 34 and 36 being journally supported via a member 38 and one end of the first door shaft 34 being coupled to one end of the second door shaft 36 (the coupling between the door shafts 34 and 36 not being specifically shown in FIG. 1). The utilization of two or more door shafts is particularly useful in those applications where the door shaft or output shaft 14 extends across a relatively large distance.

A first pulley drum 40 is secured to the output shaft 14 and a second pulley drum 42 is secured to another portion of the output shaft 14, the pulley drums 40 and 42 each being disposed generally between the journal supports 28 and 30 and the first pulley drum 40 being spaced a distance along the output shaft 14 from the second pulley drum 42.

The pulley drums 40 and 42 are similarly constructed and each of the pulley drums 40 and 42 includes a cylindrically shaped base portion 43 and a pair or retaining flanges 44, one of the retaining flanges 44 being secured to each end of the base 43. One end of a cable 46 is secured to the base 43 of the first pulley drum 40 and the opposite end of the cable 46 is secured to a lower end portion of the door member 16 via a connecting flange 48 or other such similar type of connection. One end of a cable 50 is secured to the base 43 of the second pulley drum 42 and the opposite end of the cable 50 is secured to a lower end portion of the door member 16 via a connecting flange 52 or other such similar type of connection.

A first spring 54 is disposed about a portion of the first door shaft 34 and extends generally between the first pulley drum 40 and the member 38, one end of the first spring 54 being secured to the first door shaft 34 and the opposite end of the first spring 54 being secured to the member 38. A second spring 56 is disposed about a portion of the second door shaft 36 and extends generally between the second pulley drum 42 and the member 38; one end of the second spring 56 being secured to the second door shaft 36 and the opposite end of the second spring 56 being secured to the member 38.

In some applications, the input drive assembly 12 and the brake drive assembly 15 are connected via the output shaft to a chain drive and an arm is connected to the chain drive and the door member, the output shaft driving the chain to open and close the door member. The output shaft can be connected to the door member via various other types of connections within the contemplation of the present invention.

In one typical construction, the path of travel of the door member 16 as the door member 16 is opened or closed in the general directions 22 and 26, respectively, is defined via a pair of rails (not shown), one rail being disposed generally on each side of the door member 16. The door member 16 is connected to the rails via a plurality of wheels or rollers (not shown), some of the wheels being connected to one side of the door member 16 and rollingly and guidingly disposed in one of the guide rails and the remaining wheels being connected to the opposite side of the door member 16 and retainingly and guidingly disposed within a portion of the other guide rail. In this form, the door member 16 is divided horizontally into segments 58 and each segment 58 is hingedly connected to the adjacent segment 58. It should be particularly noted that the apparatus of the present invention can also be utilized for opening and closing door members which are of unitary or single piece construction, the door member 16 being shown in the drawings as divided into the segments 58 solely for the purpose of illustration.

The input drive assembly 12 includes an input or drive shaft 60 and a ball drive assembly 61 which is connected between the input shaft 60 and the output shaft 14, such that the output shaft 14 is rotatingly driven at a predetermined reduced rate of speed as compared to the rotational speed of the portion of the input drive assembly 12 which is rotatingly driven via the drive chain 18. The apparatus 10 includes a housing 62 having an opening 63 formed through a portion thereof, and one end portion of the output shaft 14 is disposed in the housing 62 opening 63 and supported therein for rotation about a drive axis 64 substantially corresponding to the centerline, axially extending axis of the housing 62 opening 63, the input shaft 60 also being disposed and supported in the housing 62 opening 63 for rotation about an axis of rotation substantially corresponding to the drive axis 64.

The input drive assembly 12 includes a generally circularly shaped chain connector 66 having an opening 68 formed through a central portion thereof and a chain receiving channel 70 formed in a portion thereof and extending circumferentially about the outer periphery of chain connector 66. A plurality of retaining ridges 72 are formed in the chain connector 66, each of the retaining ridges 72 extending into a portion of the chain receiving channel 70 and the retaining ridges 72 being spaced circumferentially about the chain receiving channel 70. The chain connector 66 is supported for rotation about an axis of rotation generally corresponding to the drive axis 64. The chain receiving channel 70 is shaped to receive a portion of the drive chain 18 (a portion of the drive chain 18 being shown in FIG. 2 disposed in a portion of the chain receiving channel 70) and the retaining ridges 72 are circumferentially spaced in the chain receiving channel 70 for engaging portions of the drive chain 18, the chain connector 66 being drivingly rotated in the first direction of rotation 20 via the engagement between the drive chain 18 and the retaining ridges 72 portions of the chain connector 66 as the drive chain 18 is pullingly rotated with respect to the chain connector 66 in a direction generally corresponding to the first direction of rotation 20 and the chain connector 66 being drivingly rotated in the second direction of rotation 24 via the engagement between the drive chain 18 and the retaining ridges 72 portions of the chain connector 66 as the drive chain 18 is pullingly rotated with respect to the chain connector 66 in a direction generally corresponding to the second direction of rotation 24.

The chain connector 66 includes a generally circularly shaped first ring 74 and a generally circularly shaped second ring 76. The first ring 74 has an outermost end defining an outer peripheral surface 78 and an opening formed through a central portion thereof defining an inner peripheral surface 80, an angled portion 82 being formed in the first ring 74 extending a distance in a generally radially outwardly direction, generally between the outer peripheral surface 78 and the inner peripheral surface 80. The remaining portion 84 of the first ring 76, between the angled portion 82 and the outer peripheral surface 78, extends in a generally radial direction and the remaining portion 86 of the first ring 76, between the angled portion 82 and the inner peripheral surface 80, extends in a generally radial direction.

The second ring 76 has an outermost end defining an outer peripheral surface 88 and an opening formed through a central portion thereof defining an inner peripheral surface 90, an angled portion 92 being formed in the second ring 76 extending a distance in a generally radially outwardly direction generally between the outer peripheral surface 88 and the inner peripheral surface 90. The remaining portion 94 of the second ring 76, between the angled portion 92 and the outer peripheral surface 88, extends in a generally radial direction and the remaining portion 96 of the second ring 76, between the angled portion 92 and the inner peripheral surface 90, extends in a generally radial direction. A plurality of openings 98 are formed through the portion 86 of the first ring 74 and a plurality of openings 100 are formed through the portion 94 of the second ring 76, some of the retaining ridges 72 being formed in the portion 84 of the first ring 74 and the remaining retaining ridges 72 being formed in the portion 94 of the second ring 76.

In the assembled position of the chain connector 66, the portions 86 and 96 of the first and the second rings 74 and 76 are positioned in an abutting relationship with each of the openings 98 aligned with one of the openings 100, the portions 82, 84, 92 and 94 combining to form the chain receiving channel 70 with the retaining ridges 72 formed on the first ring 74 being spaced a distance from the retaining ridges 72 formed on the second ring 76 for accommodating portions of the drive chain 18 disposed therebetween, as shown in FIG. 2. Further, in an assembled position of the chain connector 66, the inner peripheral surfaces 80 and 90 are aligned and form the opening 68, the outer peripheral surface 78 and 88 being aligned and forming the outer peripheral surface of the chain connector 66. Chain connectors constructed and operating in a manner described above with respect to the chain connector 66 and the drive chain 18 are known in the art and a further detailed description is not required herein.

Referring more particularly to the housing 62, the housing 62 has an outer peripheral surface 104, opposite ends 106 and 108 and a bore 110 extending axially therethrough intersecting the opposite ends 106 and 108, the axially extending centerline of the bore 110 substantially corresponding to the drive axis 64. The bore 110 forms a portion of the housing 62 opening 63.

The bearing surface 112 is formed on the end 108 of the housing 62, the bearing surface 112 intersecting a portion of the outer peripheral surface 104 and a portion of the end 108. The bearing surface 112 extends at an angle 113 with respect to the drive axis 64. The bearing surface 112 forms a portion of the ball drive assembly 61 and the housing 62 is sometimes referred to herein as the fixed member 62 portion of the ball drive assembly 61, the bearing surface 112 being sometimes referred to herein as the fixed member bearing surfaces 112 since the housing or fixed member 62 remains in a fixed, stationary, non-rotating position during the operation of the apparatus 10.

The input shaft 60 has an outer peripheral surface 115, opposite ends 116 and 118 and a bore 120 extending axially therethrough intersecting the opposite ends 116 and 118. The input shaft 60 is disposed through a portion of the housing 62 opening 63 and, more particularly, a portion of the input shaft 60 generally near the end 116 is disposed within a portion of the bore 110 generally near the end 108 of the housing 62. A counterbore 122 is formed in the housing 62, having a portion intersecting the bore 110 and a diameter slightly larger than the diameter of the bore 110, the counterbore 122 forming an annular stop surface 124 and cooperating to form a portion of the housing 62 opening 63. A bearing member 126 is disposed in the counterbore 122 and the stop surface 124 engages the bearing member 126 and limits the movement of the bearing member 126 in an axial direction generally toward the end 108 of the housing 62. The input shaft 60 is disposed through the bearing member 126 and the bearing member 126 bearingly engages a portion of the outer peripheral surface 115 of the input shaft 60, the bearing member 126 bearingly supporting the input shaft 60 for rotation in the first and the second directions of rotation 20 and 24 about an axis of rotation substantially corresponding to the drive axis 64.

A portion of the input shaft 60 extends through an opening 128 formed through a central portion of a driven member 130. The driven member 130 has opposite ends 132 and 134 and an outer peripheral surface 136. A channel 138 is formed in the driven member 130 extending a distance radially outwardly toward the outer peripheral surface 136 and extending axially through the driven member 130 intersecting the opposite ends 132 and 134 and the opening 128.

One end of the key member 140 is connected to a portion of the surface formed in the driven member 130 by the channel 138 and the key member 140 extends a distance radially inwardly terminating with an outermost end 142. A portion of the key member 140 generally near the outermost end 142 thereof is disposed in a slot 144 formed through a portion of the input shaft 60, the slot 144 intersecting a portion of the outer peripheral surface 115 and the bore 120 of the input shaft 60. Thus, the input shaft 60 is keyed to the driven member 130 via the key member 140 such that the input shaft 60 is rotatingly driven in the first and the second directions of rotation 20 and 24 by the driven member 130 via the connection between the input shaft 60 and the driven member 130 provided by the key member 140 and the slot 144.

A bearing surface 146 is formed on the driven member 130, and the driven member bearing surface 146 intersects the end 132 and the outer peripheral surface 136 of the driven member 130. The bearing surface 146 is angularly disposed and extends at an angle 148 with respect to the drive axis 64.

The ball drive assembly 61 includes a driving member 150 having opposite ends 152 and 154, an outer peripheral surface 156 and an opening formed through a central portion thereof defining an inner peripheral surface 158. A first bearing surface 160 is formed in the driving member 150 and the first bearing surface 160 extends at an angle 162 with respect to the drive axis 64. A second bearing surface 164 is formed in the driving member 150 and the second bearing surface 162 extends at an angle 166 with respect to the drive axis 64.

A first retaining ring 168 is disposed in an annular groove 170 formed in the outer peripheral surface 115 of the input shaft 60 and a portion of the first retaining ring 168 extends a distance radially beyond the outer peripheral surface 115. A second retaining ring 172 is disposed in an annular groove 174 formed in the outer peripheral surface 115 of the input shaft 60 and a portion of the second retaining ring 172 extends a distance beyond the outer peripheral surface 115, the second retaining ring 172 being spaced a distance axially along the input shaft 60 from the first retaining ring 168. The first retaining ring 168 engages a portion of the bearing member 126 limiting the axial movement of the input shaft 60 in a first axial direction 176 and the second retaining ring 172 engages one end portion of a spring 178, the opposite end of the spring 178 biasingly engaging the end 134 of the driven member 130. The spring 178 and the retaining rings 168 and 172 cooperate to limit the movement of the input shaft 60 in a second axial direction 177 generally opposite the first axial direction 176 and to retain the input shaft 60 in an assembled position rotatingly supported within a portion of the housing 60.

A plurality of circumferentially spaced openings 180 are formed through the driving member 150, each opening 180 extending through the driving member 150 intersecting the opposite ends 152 and 154 thereof. Each of the openings 180 is aligned with one of the openings 98 and one of the openings 100 in the first and the second rings 74 and 76, respectively, and a pin 182 is disposed through each group of aligned openings 180, 98 and 100, each pin 182 cooperating to securedly connect the chain connector 66 to the driving member 150. Thus, the driving member 150 is rotatingly driven in the first and the second directions of rotation 20 and 24 via the drive chain 18 since the chain connector 66 is secured to the driving member 150 via the pins 182.

A circularly shaped shield 184 having an opening 186 formed through a central portion thereof is positioned adjacent the end 152 of the driving member 150. A plurality of circumferentially spaced openings 188 are formed through the shield 184 and each of the openings 188 is aligned with one of the openings 180 in the driving member 150, a portion of each pin 182 extending through one of the openings 188 in the shield 184 and the pins 182 cooperating to secure the shield 184 to the driving member 150. The diameter of the opening 186 in the shield 184 is slightly larger than the diameter of the outer peripheral surface 104 of the housing 60 so the input drive assembly 12, including the shield 184, is allowed to rotate in the first and the second directions of rotation 20 and 24 relative to the fixed, stationary housing 62. The shield 184 is positioned and cooperates to retain lubricating fluid within a portion of the apparatus 10.

The input shaft 60 extends through the opening 68 in the chain connector 66, through the opening 128 in the driven member 130 and through a portion of the opening 63 in the housing 62, and the input shaft 60 is rotatingly supported in this position via the bearing member 126. The housing 62 is secured in a non-rotating, stationary, fixed position via a plurality of fasteners 190, the housing 62 being secured to the journal support 28 (shown in FIG. 1) via the fasteners 190. The input shaft 60, the driven member 130, the driving member 150 and the chain connector 66 are each supported for rotation about a common axis of rotation substantially corresponding to the axially extending drive axis 64. The annular bearing surface 112, 146, 160 and 164 each extend annularly about and are supported to be concentric with a common axis substantially corresponding to the drive axis 64, the fixed member bearing surface 112, the driving member 150 bearing surfaces 160 and 164 and the driven member 130 bearing surface 146 being coaxially supported with respect to the common axis of rotation (the brake drive axis 64) of the output member 14 and the drive shaft 60.

Figure 5:
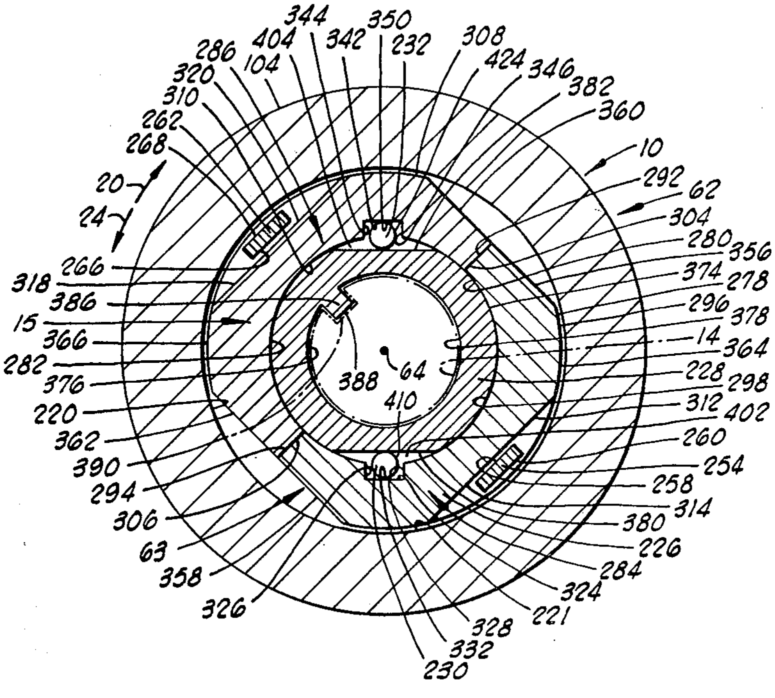
FIG. 5 is a sectional view of the brake drive assembly, taken substantially along the lines 5—5 of FIG. 4.

The annular bearing surfaces 112, 146, 160 and 164 are oriented and disposed to define an annular ball race 192 (shown more clearly in FIG. 5) having a centerline, axially extending axis substantially corresponding to the drive axis 64. A plurality of balls 194 are disposed and rollingly retained within the annular ball race 192. The annular bearing surfaces 112, 146, 160 and 164 and further oriented and disposed with respect to the balls 194 and the drive axis 64 such that the fixed member bearing surface 112 contacts the balls 194 at the contact point 196, the driving member 150 bearing surface 160 contacts the balls 194 at a contact point 198, the driving member 150 bearing surface 164 contacts the balls 194 at a contact point 200 and the driven member 130 bearing surface 146 contacts the balls 194 at a contact point 202. The contact points 196, 198, 200 and 202 define annular contact surfaces engaging the balls 194 during the operation of the apparatus 10 and are referred to herein as contact points merely for the purpose of clarity of description since there is essentially a point contact between the bearing surfaces and any one ball at any instant in time during the operation.

The relationship between the rotational speeds of the housing 62, the driving member 150 and the driven member 130 is generally expressed via the following algebraic equation:

$$n_x = n_x(i) + n_y(1-i) \qquad (1)$$

wherein:

$n_x$ = the rotational speed of the driven member 130;

$n_y$ = the rotational speed of the fixed member or housing 62;

$n_z$ = the rotational speed of the driving member 150; and i = the reduction ratio, i.e. the ratio of $(n_z/n_x)$.

The fixed member or housing 62 is secured in a stationary position via the fasteners 190 and does not rotate during the operation of the input drive assembly 12. Thus, the fixed member 62 is stationary relative to the common drive axis 64 ($n_y=0$), and the algebraic expression (1) is expressed as follows:

$$n_x/n_z = i \qquad (2)$$

By the same token, if the driven member 130 is stationary relative to the common drive axis 64 ($n_z=0$, the algebraic expression (1) is expressed as follows:

$$n_x/n_y = 1-i \qquad (3)$$

When the absolute value of "i" is greater than (1) [i>1], the input shaft 60 rotates slower than the driving member 150 which is rotatingly driven via the drive chain 18, Also, when the value of "i" is greater than zero (0) [i>0], the ratio of $(n_x/n_z)$ will be greater than the value of the ratio of $(n_x/n_y)$.

Assuming the driving member 150 remains or is held stationary, the relationship between the rotational speeds of the fixed member 62 and the driven member 130 is expressed as follows:

$$n_y/n_x = i/(i-1) \qquad (4)$$

In general, and referring to the operation of the ball drive assembly 61 operating according to the algebraic expression (2), the quantity "i" may vary between values of plus infinity and minus infinity. When the quantity of "i" is greater than zero (0), the driven member 130 rotates in the same direction as the driving member 150. When the quantity of "i" is less than zero (0), the driven member 130 rotates in the opposite direction as compared to the direction of rotation of the driving member 150. When the quantity of "i" is equal to infinity, the driven member 130 does not rotate and the ball drive input drive assembly 12 will operate as a ball bearing. When the absolute value of the quantity "i" is greater than unity, the driven member 130 rotates at a slower speed than the driving member 150. When the absolute value of the quantity "i" is less than unity, the driven member 130 rotates faster than the driving member 150. When the quantity "i" is equal to zero (0), the driven member 130 will rotate at a relatively high speed but will not transmit any torque. When the absolute value of the quantity "i" is unity, the driven member 130 rotates at the same speed as the driving member 150.

The efficiency of the ball drive assembly 61 is proportional to the ratio of the coefficients of sliding to rolling friction between the balls 194 and the bearing surfaces 112, 146, 160 and 164, this factor influencing the selection of materials and lubricants for utilization in the ball drive assembly 61. To enhance the rolling of the balls 194 along the bearing surfaces 112, 146, 160 and 164, sufficient normal force must exist between the bearing surfaces 112, 146, 160 and 164 and the balls 194, a condition achieved via the supporting of input shaft 60 and augmented via the spring 178 applying a biasing force between the driven member 130 and input shaft 60 and the driven member 130 connected thereto in the second axial direction 177 generally toward the balls 194.

The various relationships defining various constructions of devices such as the ball drive assembly 61 were disclosed in detail in the copending application entitled "BALL BEARING SPEED TRANSMISSION DEVICE", filed on June 28, 1972, Ser. No. 267,182, and assigned to the assignee of the present invention, and in the copending application entitled "APPARATUS FOR OPENING AND CLOSING DOOR MEMBERS AND THE LIKE", filed May 2, 1974, Ser. No. 446,280 and now U.S. Pat. No. 3,955,661, and assigned to the assignee of the present invention.

Referring more particularly to the ball drive input drive assembly, 12, the housing 62, the driving member 150 and the driven member 130, including the bearing surfaces 112, 146, 160 and 164 and the associated contact points 196, 198, 200 and 202, have each been particularly constructed to effect a predetermined speed reduction between the driving member 150 which is rotatingly driven via the drive chain 18 and the driven member 130 and the drive shaft 60 connected thereto, the following design parameters having been found to provide satisfactory, desired operating characteristics:

TABLE I

1. A speed reduction between the driving member 150 which is rotatingly driven via the drive chain 18 and the driven member 130 and the drive shaft 60 connected thereto of approximately 4.3-to-1.
2. A fixed member 62 fixed bearing surface 112 disposed at the angle 113 of approximately forty degrees (40°) with respect to the drive axis 64.
3. A driving member 150 bearing surface 160 disposed at the angle 162 of approximately twenty-eight degrees (28°) with respect to the drive axis 64.
4. A driving member 150 bearing surface 164 disposed at the angle 166 of approximately eighty-one (81°) with respect to the drive axis 64.
5. A driven member 130 bearing surface 146 disposed at the angle 148 of approximately twenty-eight degrees (28°) with respect to the drive axis 64.
6. A fixed member having the fixed bearing surface 112 portion constructed of Bearing Quality Steel and having fixed member bearing surface 112 contact points 196 spaced a distance 204 of approximately [1 9/16] inches on a radius measured from the drive axis 64.
7. A driving member 150 constructed of Bearing Quality Steel and having bearing surface 160 contact points 198 spaced a distance 206 approximately [2 5/32] inches radius measured from the drive axis 64, the bearing surface 160 contact points 198 being spaced a distance 208 of approximately [½] inch from the fixed bearing surface 112 contact points 196 of the fixed member or housing 62.
8. A driving member 150 having bearing surface 164 contact points 200 spaced a distance 210 of approximately [1 15/16] inches radius measured from the drive axis 164, and bearing surface 164 contact points 200 spaced a distance 212 of approximately [½] inch from the bearing surface 160 contact points 198.
9. A driven member 130 constructed of Bearing Quality Steel and having bearing surface 146 contact points 202 spaced a distance 214 approximately [1 19/32] inches on a radius measured from the drive axis 64, the bearing surface 146 contact points 202 being spaced a distance 216 of approximately [7/16] inch from the bearing surface 160 contact points 200 of the driving member 150 and spaced a distance 218 of approximately [¼] inch from the fixed bearing surface 112 contact points 196 of the housing 62.

Another counterbore 220 is formed in the housing 62, the counterbore 220 intersecting the end 106 of the housing 62 and extending a distance axially therein. The counterbore 220 has a diameter larger than the diameter of the bore 110 and larger than the diameter of the counterbore 122, the counterbore 220 cooperating with the bore 110 and the counterbore 122 to form the opening 63 extending axially through the housing 62 and intersecting the opposite ends 106 and 108. The counterbore 220 forms brake surface 221 in the housing 62, the brake surface 221 having a diameter 223 and extending annularly about an axial axis substantially corresponding to the drive axis 64.

The brake drive assembly 15 is shown more clearly in FIGS. 2, 3, 4, 5 and 6 and, in general, the brake drive assembly 15 includes: a brake ring 224; a brake shoe 226; a driven cam 228; a pair of brake rollers 230 and 232; a cover 234; and a retaining ring 236. The brake drive assembly 15 is disposed in the housing 62 opening 63 and is disposed between the input shaft 60 and the output shaft 14 to provide the driving connection or coupling therebetween so the output shaft 14 is rotatingly driven in the first and the second directions of rotation 20 and 24 via the input shaft 60, the input shaft 60 being rotatingly driven by the input drive assembly 12. Also, the brake drive assembly 15 provides a coupling between the output shaft 14 and the input drive assembly 12 operating to prevent the rotation of the output shaft 14 in response to a torque applied at the output shaft 14.

The brake ring 224 is generally circularly shaped having an outer peripheral surface 238, an opening 240 formed through a central portion thereof, a first face 242 and a second face 244. One end of a generally rectangularly shaped key element 246 is connected to a portion of the inner peripheral surface formed by the opening 240 in the brake ring 224 and the key element 246 extends a distance radially inwardly terminating with an outermost end 248. A first flat surface 250 is formed on the brake ring 224, the first flat surface 250 extending across a portion of the brake ring 224 along a path defining a chord and intersecting the portions of the outer peripheral surface 238 thereof, and a second flat surface 252 is formed on the brake ring 224, the second flat surface 252 extending across a portion of the brake ring 244 along a path defining a chord and intersecting portions of the outer peripheral surface 238 thereof. The first flat surface 250 is oriented approximately one-hundred and eighty degrees (180°) from the second flat surface 252. One end of a generally rectangularly shaped first flange 254 is connected to the first flat surface 250 and the first flange 254 extends a distance generally perpendicularly from the first face 242 terminating with an outermost end 256, the first flange 254 providing a first surface 258 and a second surface 260 extending a distance axially from the brake ring 224 generally in the second axial direction 117. One end of a generally rectangularly shaped second flange 262 is connected to the second flat surface 252 and the second flange 262 extends a distance generally perpendicularly from the first face 242 terminating with an outermost end 264, the second flange 262 providing a first surface 266 and a second surface 268 extending a distance axially from the brake ring 224 generally in the second axial direction 177.

A slot 270 is formed in the end 116 of the input shaft 60 and extends a distance axially into the input shaft 60 terminating with an end wall 272, as more clearly shown in FIG. 2. The brake ring 224 is disposed on the input shaft 60, generally near the end 116 thereof, and one end portion of the input shaft 60, generally near the end 116, is inserted through the opening 240 in the brake ring 224. In the assembled portion of the brake ring 224 and the input shaft 60, the key element 246 of the brake ring 224 is disposed in the slot 270 in the input shaft 60 to a position wherein the key element 246 abuts the end wall 272 thereby limiting the movement of brake ring 224 on the input shaft 60 in the first axial direction 176. The brake ring 224 is connected to the input shaft 60 so the brake ring 224 is drivingly rotated in the first and the second driving directions 20 and 24 by the input shaft 60 during the operation of the apparatus 10, and the first and the second flanges 254 and 262 each extend a distance axially beyond the end 116 of the input shaft 60 in the assembled position of the brake ring 224 on the input shaft 60.

The brake shoe 226 is generally cylindrically shaped, and has opposite end faces 274 and 276, an outer peripheral surface 278 and an opening 280 formed through a central portion thereof forming an inner peripheral surface 282. The outer peripheral surface 278 of the brake shoe 226 has a diameter 281 and the brake shoe 226 is supported in an assembled position such that the outer peripheral surface 278 extends concentrically about the drive axis 64. The inner peripheral surface 282 has a diameter 283 and the brake shoe 226 is supported in an assembled position such that the inner peripheral surface 282 extends concentrically about the drive axis 64.

The brake shoe 226 comprises a first brake shoe element 284 and a second brake shoe element 286, the first and the second brake shoe elements 284 and 286 being constructed by dividing the brake shoe 226 along a diametrically extending plane forming two substantially equal semi-cylindrically shaped halves. Thus, the first brake shoe element 284 is generally semi-cylindrically shaped having opposite end faces 288 and 290, ends 292 and 294, an outer peripheral surface 296 and an inner peripheral surface 298, and the second brake shoe element 286 is generally semi-cylindrically shaped having opposite end faces 300 and 302, ends 304 and 306, an outer peripheral surface 308 and an inner peripheral surface 310.

Figure 3:
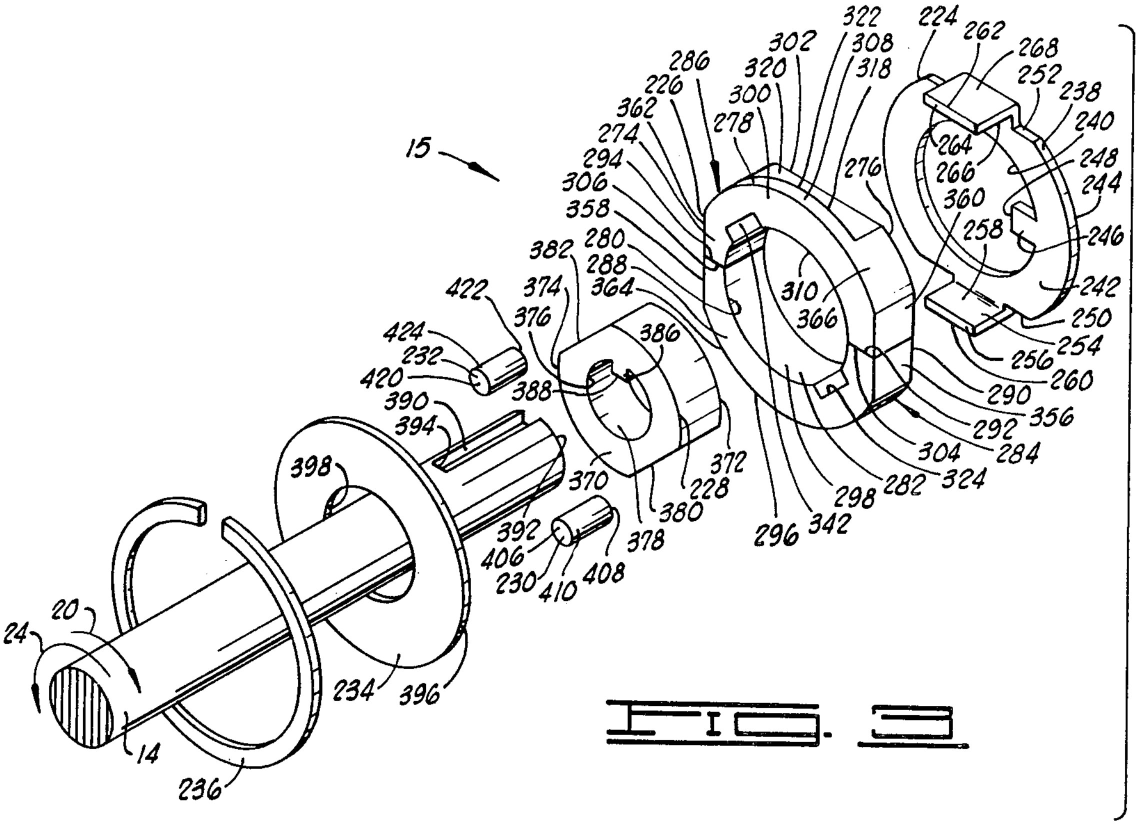
FIG. 3 is an exploded view of a portion of the brake drive assembly.

As shown in FIG. 2, a recess 312 is formed in the end face 290 of the first brake shoe element 284 forming a contact surface 314 disposed in a plane defining a chord intersecting portions of the outer peripheral surface 296. The recess 312 extends a distance into the end face 290 of the first brake shoe element 284 in an axial direction generally from the end face 290 toward the end face 288, the recess 312 terminating with an end wall 316 formed in the first brake shoe element 284. As shown in FIGS. 2 and 3, a recess 318 is formed in the end face 302 of the second brake shoe element 286 forming a contact surface 320 disposed in a plane defining a chord intersecting portions of the outer peripheral surface 308. The recess 318 extends a distance into the end face 302 of the second brake shoe element 386 in an axial direction generally from the end face 302 toward the end face 300, the recess 318 terminating with an end wall 322 formed in the second brake shoe element 286.

A channel 324 is formed in the inner peripheral surface 298 of the first brake shoe element 284 and the channel 324 extends axially through the first brake shoe element 284 intersecting the end faces 288 and 290. The channel 324 forms a pair of axially extending side walls 326 and 328 and the channel 324 extends a distance 330 radially outwardly into the first brake shoe element 284 terminating with an axially extending end wall 332. The channel 324 has a width 334, i.e. the side walls 326 and 328 are spaced apart a distance 334. The channel 324 is disposed generally between the ends 292 and 294 of the first brake shoe element 284 and, more particularly, the channel 324 is disposed at an angle 336 with respect to a first reference axis 338 extending generally perpendicular to the drive axis 64 and diametrically through the brake shoe 226. A second reference axis 340 extends perpendicular to the first reference axis 338 and perpendicular to the brake drive axis 64, the first and the second reference axes 338 and 340 forming a centerline axis of the brake drive assembly 15.

A channel 342 is formed in the inner peripheral surface 310 of the second brake shoe element 286 and the channel 326 extends axially through the second brake shoe element 286 intersecting the end faces 304 and 306. The channel 342 forms a pair of axially extending side walls 344 and 346 and the channel 342 extends a distance 348 radially outwardly into the second brake shoe element 286 terminating with an axially extending end wall 350. The channel 342 has a width 352, i.e. the side walls 344 and 346 are spaced apart a distance 352. The channel 342 is disposed generally between the ends 304 and 306 of the second brake shoe element 286 and, more particularly, the channel 342 is disposed at an angle 354 with respect to the first reference axis 338. In a preferred form, the channel 342 in the second brake shoe element 286 is disposed generally opposite the channel 324 in the first brake shoe element 284, i.e. the channel 342 is disposed approximately one-hundred eighty degrees (180°) from the channel 324.

A flat surface 356 is formed on a portion of the outer peripheral surface 296 of the first brake shoe element 284 generally near and intersecting the end 292, and a flat surface 358 is formed on a portion of the outer peripheral surface 296 of the first brake shoe element 284 generally near and intersecting the end 294. A flat surface 360 is formed on a portion of the outer peripheral surface 308 of the second brake shoe element 286 generally near and intersecting the end 304, and a flat surface 362 is formed on a portion of the outer peripheral surface 308 of the second brake shoe element 236 generally near and intersecting the end 306. The curved portion of the outer peripheral surface 296 extending between the flat surfaces 356 and 358 of the first brake shoe element 284 forms a brake surface 364, and the curved portion of the outer peripheral surface 308 extending between the flat surfaces 306 and 362 of the second brake shoe element 286 forms a brake surface 366. In an assembled position of the first and the second brake shoe elements 284 and 286, the brake surfaces 364 and 366 cooperate to form the brake surface of the brake shoe 226 and the flat surfaces 356, 358, 360 and 362 cooperate to reduce the contact surface area of the brake surfaces 364 and 366.

The first and the second brake shoe elements 284 and 286 are constructed such that, when the first and the second brake shoe elements 284 and 286 are positioned together with the end 292 of the first shoe element 284 positioned adjacent and abutting the end 304 of the second brake shoe element 286, the end 294 of the first brake shoe element 284 positioned adjacent and abutting the end 306 of the second brake shoe element 286, the end face 288 of the first brake shoe element 284 disposed in a substantially coplanar disposition with respect to the end face 300 of the second brake shoe element 286, and the end face 290 of the first brake shoe element 284 disposed in a substantially coplanar disposition with respect to the end face 302 of the second brake shoe element 286, the first and the second brake shoe elements 284 and 286 cooperating to form the brake shoe 226. In this assembled position of the first and the second brake shoe elements 284 and 286, the contact surface 314 of the first brake shoe element 284 is disposed in a plane extending generally parallel to the planar disposition of the contact surface 320 of the second brake shoe element 286, and the channel 324 in the first brake shoe element 284 is diametrically aligned with the channel 342 in the second brake shoe element 286.

The driven cam 228 is generally cylindrically shaped having opposite end faces 370 and 372, an outer peripheral surface 374 and an opening 376 extending axially through a central portion of the driven cam 228 intersecting the end faces 370 and 372 and forming an inner peripheral surface 378. A flat surface 380 is formed on a portion of the outer peripheral surface 374 and the flat surface 380 is disposed in a plane defining a chord intersecting portions of the outer peripheral surface 374. Another flat surface 382 is formed on a portion of the outer peripheral surface 374 and the flat surface 382 is disposed in a plane defining a chord intersecting portions of the outer peripheral surface 374, the flat surface 382 extending in a plane generally parallel to the planar disposition of the flat surface 380. The outer peripheral surface 374 of the driven cam 228 has a diameter 384 and the driven cam 228 is supported in an assembled position such that the outer peripheral surface 374 extends concentrically about the drive axis 64. One end of a key element 386 is connected to the inner peripheral surface 378 of the driven cam 228 and the key element 386 extends a distance generally radially inwardly terminating with an outermost end 388.

The output shaft 14 has a slot 390 formed in a portion of the outer peripheral surface thereof and the slot 390 extends a distance axially along the output member 14 intersecting one end 392 and terminating with an end wall 394 formed in the output shaft 14, as shown more clearly in FIG. 3. A portion of the output shaft 14 generally near the end 392 extends through the housing 62 opening 63 and the key element 386 on the driven cam 228 is disposed in the slot 390 in the output shaft 14 thereby connecting the driven cam 228 to the output shaft 14. Thus, the driven cam 228 is connected to the output shaft 14 via the key element 386 and the rotation of the driven cam 228 drivingly rotates the output shaft 14 in the first and the second directions of rotation 20 and 24.

The cover 234 is generally circularly shaped having an outer peripheral surface 396 and an opening 398 formed through a central portion thereof. An annular recess 400 is formed in the surface of the housing 62 formed via the counterbore 220 and a portion of the retaining ring 236 is retainingly disposed in the recess 400, the retaining ring 236 engaging a portion of the cover 234 and cooperating to secure the brake drive assembly 15 in an assembled position within the housing 62 opening 63.

The input shaft 60 is rotatingly supported by the bearing member 126 for rotation about the drive axis 64 with a portion of the input shaft 60, generally near the end 116 thereof, extending a distance axially into the housing 62 opening 63, the retaining rings 168 and 172 cooperating to axially retain the input shaft 60. The brake ring 224 is connected to the input shaft 60 via the brake ring 224 key element 246 which is retainingly disposed in the output shaft 14 slot 270, the first and the second flanges 254 and 262 extending a distance axially from the end 116 of the input shaft 60 in the second axial direction 177. The diameter of the outer peripheral surface 238 of the brake ring 224 is less than the diameter 223 of the annular brake surface 221 to provide a clearance between the outer peripheral surface 238 of the brake ring 224 and the brake surface 221 allowing the brake ring 224 to be drivingly rotated by the input shaft 60 in the first and the second directions of rotation 20 and 24.

A portion of the output shaft 14, generally near the end 392 thereof, is inserted into the housing 62 opening 63 and through the bore 120 in the input shaft 60, a portion of the output shaft 14 generally near the end 392 extending a distance axially beyond the end 118 of the input shaft 60. The diameter of the output shaft 14 is slightly less than the diameter of the inner peripheral surface formed in the drive member 60 via the bore 120, thereby providing a clearance between the outer peripheral surface of the output shaft 14 and the inner peripheral surface formed by the bore 120 so the output shaft 14 is rotatable in the first and the second directions of rotation 20 and 24 within the bore 120 of the input member 60.

The driven cam 228 is disposed on and connected to the output shaft 14 generally near the end 392 thereof, a portion of the output shaft 14 being inserted through the opening 376 of the driven cam 228 and the driven cam 228 being oriented such that the key element 386 is retainingly disposed in a portion of the slot 390 in the output shaft 14 thereby connecting the driven cam 228 to the output member 14. The key element 386 and slot 390 connection between the driven cam 228 and the output shaft 14 positions the driven cam 228 in a predetermined circumferential position on the output shaft 14 and the abutment between the key element 354 and the end wall 394 formed in the output member 14 by the slot 390 limits the movement of the driven cam 228 along the output member 14 in the second axial direction 177 thereby positioning the driven cam 228 in a predetermined position on the output member 14 in one axial direction. The cover 234 is disposed in the housing 62 opening 63 and positioned therein such that a portion of the cover 234 engages a portion of the end face 372 of the driven cam 228 and the cover 234 is secured in an assembled position via the retaining ring 236 which engages a portion of the cover 234 and secures the cover 234 between the retaining ring 236 and the driven cam 228.

The driven cam 228 is disposed in the opening 280 of the brake shoe 226 and oriented such that the flat surface 380 is disposed near the channel 324 in the first brake shoe element 284, the channel 324 and the flat surface 380 cooperating to provide an axially extending first open space 402 between the driven cam 228 and the first brake shoe element 284, and the flat surface 382 is disposed near the channel 326 in the second brake shoe element 286, the channel 326 and the flat surface 382 cooperating to provide an axially extending second open space 404 between the driven cam 228 and the second brake shoe element 286. In the assembled position with the driven cam 228 disposed in the opening 280 in the brake shoe 226, the end face 370 of the driven cam 228 is substantially aligned with the end face 274 of the brake shoe 226 and the end face 372 of the driven cam 228 is substantially aligned with the end face 276 of the brake shoe 226. Further, the diameter 384 of the driven cam 228 is slightly less than the diameter 283 of the inner peripheral surface 282 formed by the opening 280 in the brake shoe 226 in the closed mode of the first and the second brake shoe elements 284 and 286 wherein the end 292 of the first brake shoe element 284 abuts the end 304 of the second brake shoe element 286 and the end 294 of the first brake shoe element 284 abuts the end 306 of the second brake shoe element 286.

The outer peripheral surface 374 of the driven cam 228, the inner peripheral surfaces 298 and 310 of the first and the second brake shoe elements 284 and 286, the brake surfaces 364 and 366 of the first and the second brake shoe elements 284 and 286, and the brake surface 221 formed in the housing 62 each extend concentrically about a common axis substantially corresponding to the drive axis 64 thereby providing what may be referred to as a "single centered" brake drive assembly 15. The input drive assembly 12, the drive shaft 60, the brake ring 224, the brake shoe 226, the driven cam 228 and the output shaft 14 are each supported for rotation about the common axis of rotation (the drive axis 64).

The brake roller 230 (sometimes referred to herein as the "first brake roller") is generally cylindrically shaped having opposite ends 406 and 408, an outer peripheral surface 410 and a diameter 412. The first brake roller 230 is disposed in the first open space 402 between the driven cam 228 flat surface 380 and the channel 324 in the first brake shoe element 284 to a position wherein the end 406 of the first brake roller 230 is disposed generally in a coplanar disposition with respect to the end face 370 of the driven cam 228 and the end face 274 of the brake shoe 226, and the end 408 of the first brake roller 230 is disposed generally in a coplanar disposition with respect to the end face 372 of the driven cam 228 and the end face 276 of the brake shoe 226. The diameter 412 of the first brake roller 230 is greater than the distance 330 between the end wall 332 formed in the first brake shoe element 284 by the channel 324 in the inner peripheral surface 298 of the first brake shoe element 284, and the diameter 412 is slightly less than the width 334 of the channel 324 in the first brake shoe element 284. Thus, a portion of the first brake roller 230 is retainingly disposed in the channel 324 and a portion of the first brake roller 230 extends beyond the inner peripheral surface 298 of the first brake shoe element 284, a portion of the outer peripheral surface 410 of the first brake roller 230 being disposed near the flat surface 380 of the driven cam 228 in an assembled position.

The brake roller 232 (sometimes referred to herein as the "second brake roller") is generally cylindrically shaped having opposite ends 420 and 422, an outer peripheral surface 424 and a diameter 426. The second brake roller 232 is disposed in the second open space 404 between the driven cam 228 flat surface 382 and the channel 342 in the second brake shoe element 286 to a position wherein the end 420 of the second brake roller 232 is disposed generally in a coplanar disposition with respect to the face 370 of the driven cam 228 and the end face 274 of the brake shoe 226, and the end 422 of the second brake roller 232 is disposed generally in a coplanar disposition with respect to the end face 372 of the driven cam 228 and the end face 276 of the brake shoe 226. The diameter 426 of the second brake roller 232 is greater than the distance 348 between the end wall 350 formed in the second brake shoe element 286 by the channel 342 and the inner peripheral surface 310 of the second brake shoe element 286, and the diameter 426 is slightly less than the width 352 of the channel 342 in the second brake shoe element 286. Thus, a portion of the second brake roller 232 is retainingly disposed in the channel 342 and a portion of the second brake roller 230 extends beyond the inner peripheral surface 310 of the second brake shoe element 286, a portion of the outer peripheral surface 424 of the second brake roller 232 being disposed near the flat surface 382 of the driven cam 228 in an assembled position.

During the operation of the apparatus 10 and assuming the input drive assembly 12 is drivingly rotating the input shaft 60 in the first direction of rotation 20, the brake ring 224 is rotatingly driven in the first direction of rotation 20 via the key element 246 connection between the brake ring 224 and the input shaft 60 to a position wherein a portion of the brake ring 224 first flange 254 engages the contact surface 314 formed on the first brake shoe element 284 along a contact path 430 spaced a distance 432 radially outwardly in a horizontal plane from the drive axis 64, and a portion of the brake ring 224 second flange 262 approximately simultaneously engages the contact surface 320 formed on the second brake shoe element 286 along a contact path 434 spaced a distance 436 radially outwardly in a horizontal plane from the drive axis 64 in a generally opposite direction with respect to the contact path 430 and the distance 436. The engagement of the first flange 254 with the contact surface 314 results in a component force 438 acting on the first brake shoe element 284 generally along the contact path 430 at a position spaced the distance 432 from the drive axis 64 in a direction generally from the first brake shoe element 284 toward the second brake shoe element 286 tending to drive the first brake shoe element 284 in the first direction of rotation 20 and in a direction tending to collapse the first brake shoe element 284 toward the second brake shoe element 286 thereby moving the brake surface 364 in a direction generally away from the brake surface 221 formed in the housing 62. The engagement of the second flange 262 with the contact surface 320 results in a component force 440 acting on the second brake shoe element 286 generally along the contact path 434 at a position spaced the distance 436 from the brake drive axis 64 in a direction generally from the second brake shoe element 286 toward the first brake shoe element 284 tending to drive the second brake shoe element 286 in the first direction of rotation 20 and tending to collapse the second brake shoe element 286 toward the first brake shoe element 284 thereby moving the brake surface 366 in a direction generally away from the brake surface 221 formed in the housing 62. The forces 438 and 440 cooperate to collapse and to position the first and the second brake shoe elements 284 and 286 in the driving mode wherein the ends 292 and 304 and the ends 294 and 306 abut and the brake surfaces 364 and 366 are biased in a direction generally away from the brake surface 221 allowing the first and the second brake shoe elements 284 and 286 to be rotatingly driven in the first direction of rotation 20 via the engagement between brake ring 224 and the brake shoe 226, i.e. the engagement between the first and the second flanges 254 and 262 and the contact surfaces 314 and 320, respectively.

As the brake shoe 226 is rotatingly driven in the first direction of rotation 20, the first brake roller 230 is retained within the channel 324 in the first brake shoe element 284 and portions of the outer peripheral surface 410 of the first brake roller 230 contactingly engages the flat surface 380 of the driven cam 228 along a contact path 442 spaced a distance 444 radially outwardly in a horizontal plane from the drive axis 64, portions of the first brake roller 230 also contactingly engaging portions of the first brake shoe element 284. The second brake roller 232 is retained within the channel 342 in the second brake shoe element 286 and a portion of the outer peripheral surface 424 of the second brake roller 232 contactingly engages the flat surface 382 of the driven cam 228 along a contact path 446 spaced a distance 448 radially outwardly in a horizontal plane from the drive axis 64, portions of the second brake roller 232 also contactingly engaging portions of the second brake shoe element 286. The brake shoe 226 drivingly rotates the driven cam 228 in the first direction of rotation 20 via the connection between the brake shoe 226 and the driven cam 228 provided via the first and the second brake roller 230 and 232, the driven cam 228 rotatingly driving the output shaft 14 in the first direction of rotation 20 via the connection therebetween provided via the key element 386 on the driven cam 228 disposed in the slot 390 in the output shaft 14.

The distance 432 is greater than the distance 444, and the distance 436 is greater than the distance 448. Assuming the load on the output shaft 14 and applied to the driven cam 228 (the door member 16 and associated components, for example) acts on the driven cam 228 in a direction generally opposed to the driving direction, then the load on the output shaft 14 will tend to back drive the brake drive assembly 15. Thus, assuming the driven cam 228 is rotatingly driven in the first direction of rotation 20, and the load on the driven cam 228 tends to back drive the brake drive assembly 15 in the second direction of rotation 24, and, assuming the load on the output shaft 14 acts in the first direction of rotation 20, when the driven cam 228 is rotatingly driven in the second direction of rotation 24, the load on the driven cam 228 tends to back drive the brake drive assembly 15 in the first direction of rotation 20.

The distance 432 is greater than the distance 444 by a distance 474, and the distance 436 is greater than the distance 448 by a distance 476. It has been found that, as the distances 474 and 476 are increased, the efficiency of the brake drive apparatus 10 is decreased, i.e, the torque applied via the input drive assembly 12 is transferred to the output shaft 14 via the brake drive assembly 15 in a less efficient manner. If the distance 436 is less than the distance 448, it has been found that the brake drive assembly 15 is not reliable, i.e. the brake drive assembly 15 may not be conditioned in the braking mode in response to a torque applied at the output shaft 14 or, in other words, the brake drive assembly 15 may fail thereby rendering the brake drive assembly 15 unreliable and not what is generally referred to in the art as an "unsafe" brake.

Figure 6:
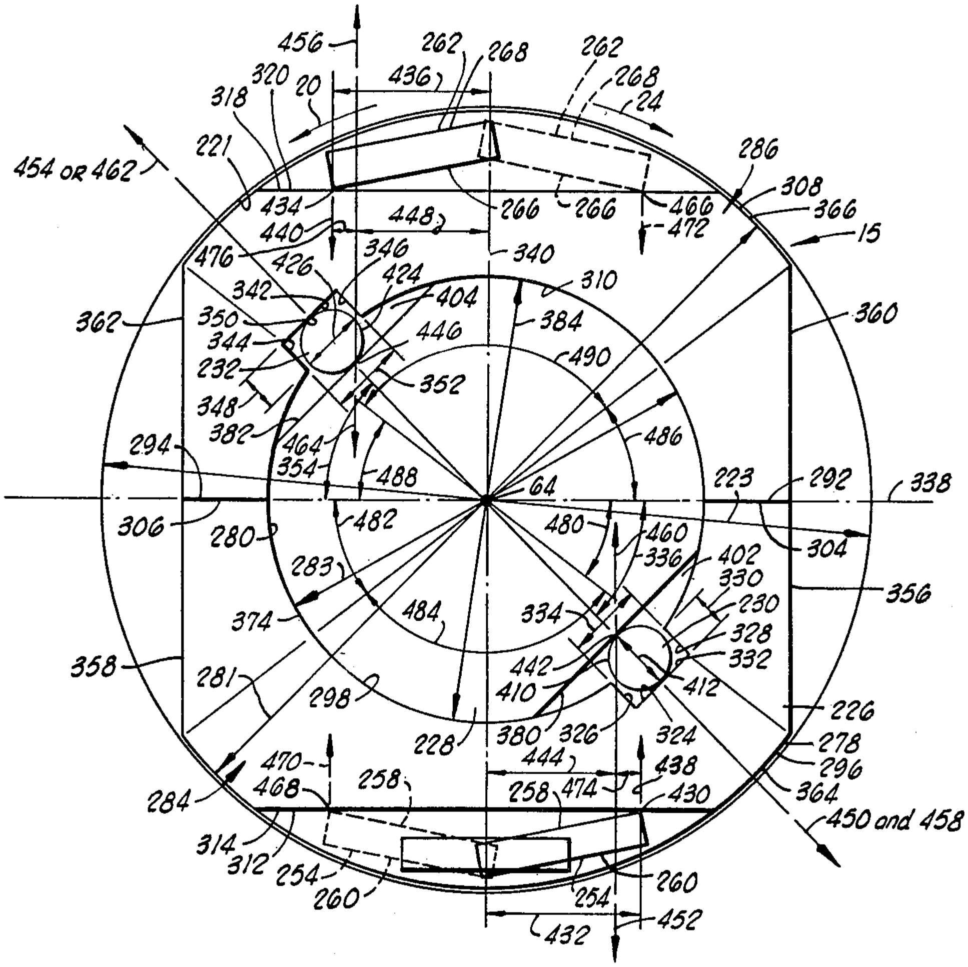
FIG. 6 is an enlarged diagrammatic view of the brake drive assembly of FIGS. 2, 3, 4 and 5.

Assuming the brake drive assembly 15 is rotatingly driven in the first direction of rotation 20 and the load on the driven cam 228 tends to back drive the driven cam 228 in the second direction of rotation 24, the load on the driven cam 228 or, in other words, the load on the output shaft 14 causes the flat surface 380 to contactingly engage the first brake roller 230 and results in a force applied to the first brake shoe element 284 via the first brake roller 230, the force applied to the first brake roller 230 comprising the component forces 450 and 452 diagrammatically shown in FIG. 6. The component force 452 acts in a direction generally parallel to the component force 438 resulting from the contacting engagement between the first flange 254 and the contact surface 314 in the first brake shoe element 284, and the component force 452 is spaced a distance 444 from the drive axis 64 which is less than the distance 432, thereby producing a moment about the contact path 430 in a direction generally corresponding to the driving direction of rotation, i.e. the first direction of rotation 20. The moment about the contact path 430 causes the first brake shoe element 284 to tend to be moved toward a braking mode position, thereby producing a drag, i.e. some contact between the brake surface 364 and the brake surface 221. Thus, the torque applied to the first brake shoe element 284 causes a moment about the contact path 430 in the general direction of rotation which acts on the first brake shoe element 284 in a manner tending to move the first brake shoe element 284 toward a braking mode, thereby producing a drag which renders the brake drive assembly 15 less efficient but more safe.

By the same token and in this condition, the load on the driven cam 228 tending to back drive the driven cam 228 in the second direction of rotation 24 causes the flat surface 382 to contactingly engage the second brake roller 232 resulting in a force applied to the second brake shoe element 286 via the second brake roller 232, the force applied to the second brake roller 232 comprising the component forces 454 and 456 diagrammatically shown in FIG. 6. The component force 456 acts in a direction generally parallel to the component force 440 resulting from the contacting engagement between the second flange 262 and the contact surface 320 in the second brake shoe element 286, and the component force 456 is spaced the distance 448 from the drive axis 64 which is less than the distance 436 thereby producing a moment about the contact path 434 in a direction generally corresponding to the driving direction of rotation, i.e. the first direction of rotation 20. The moment about the contact path 434 causes the second brake shoe element to tend to be moved toward a braking mode, thereby producing a drag, i.e. some contact between the brake surface 366 and the brake surface 221. Thus, the torque applied to the second brake shoe element 286 causes a moment about the contact path 434 in a general direction of rotation wl ch acts on the second brake shoe element 286 in a manner tending to move the second brake shoe element 286 toward a braking mode, thereby producing a drag which renders the brake drive assembly 15 less efficient but more safe.

The apparatus 10 is constructed such that the input torque applied via the input driven assembly 12 and resulting in the forces 438 and 440 applied to the first and the second brake shoe elements 284 and 286 for drivingly rotating the brake shoe 226, the driven cam 228 and the output member 14 in the first direction of rotation 20 are greater than the forces applied to the brake shoe 226 as a result of the load on the output shaft 14 such as the forces 452 and 456. Thus, the output shaft 14 continues to be rotatingly driven in the first direction of rotation 20 even though the load on the output shaft 14 results in forces applied to the first and the second brake shoe elements 284 and 286 in a direction which would tend to move the first and the second brake shoe elements 284 and 286 toward braking engagement with the brake surface 221 of the housing 62. However, if the forces 452 and 456 exceed the forces 438 and 440, the first and second brake shoe elements 284 and 286 will be moved into braking engagement with the brake surface 221 in the housing 62 thereby positioning the brake drive assembly 15 in the braking mode.

When the input drive assembly 12 ceases to be rotatingly driven, the forces 438 and 440 are substantially zero. In this condition and assuming a force or a load is applied to the output shaft 14 and the driven cam 228 connected thereto in a manner tending to rotate the driven cam 228 in the second direction of rotation 24, the forces 452 and 456 are applied to the first and the second brake shoe elements 284 and 286 which force the first and the second brake shoe elements 284 and 286 into braking engagement with the brake surface 221 of the housing 62, thereby positioning the brake drive assembly 15 in the braking mode. In this condition and assuming a load or force is applied to the output shaft 14 and the driven cam 228 connected thereto in a manner tending to rotate the driven cam 228 in the first direction of rotation 20, the flat surface 380 contactingly engages the first brake roller 230 and applies a force to the first brake shoe element 284 via the first brake roller 230, the force applied to the first brake roller 230 comprising the component forces 458 and 460. In this condition and assuming a load or force is applied to the output shaft 14 and the driven cam 228 connected thereto tending to rotate the driven cam 228 in the first direction of rotation 20, the flat surface 382 contactingly engages the second brake roller 232 and applies a force to the second brake shoe element 286 via the second brake roller 232 and the force applied to the second brake roller 232 comprises the component forces 462 and 464, the component forces 458 and 462 cooperating and acting on the first and the second brake shoe elements 284 and 286 in a direction moving the first and the second brake shoe elements 284 and 286 into braking engagement with the brake surface 221 of the housing 62 and positioning the brake drive assembly 15 in the braking mode. Thus, when the input drive assembly 12 is not rotatingly driven, a force or a load applied on the output shaft 14 and the driven cam 228 in either the first or the second directions 20 or 24 results in a force applied to the first and the second brake shoe elements 284 and 286 moving the first and the second brake shoe elements 284 and 286 into braking engagement with the brake surface 221 of the housing 62 and positioning the brake drive assembly 15 in the braking mode.

Referring more particularly to the operational embodiment of the present invention shown in FIG. 1 and assuming the drive chain 18 is pulled in a direction causing the input drive assembly 12 to be rotatingly driven in the first direction of rotation 20, the input shaft 60 and the brake ring 224 connected thereto are rotatingly driven in the first direction of rotation 20 moving the first and the second flanges 254 and 262 into contacting engagement with the contact surfaces 314 and 320 and resulting in the forces 438 and 440 being applied to the first and the second brake shoe elements 284 and 286 collapsing the first and the second brake shoe elements 284 and 286 and moving the first and the second brake shoe elements 284 and 286 generally away from the brake surface 221 in the housing 62 and into the driving mode. The first and the second brake shoe elements 284 and 286 are rotatingly driven in the first direction of rotation 20 via the brake ring 224, and the rotating first and second brake shoe elements 284 and 286 cooperate to rotatingly drive the driven cam 228 and the output shaft 14 connected thereto in the first direction of rotation 20, the first brake shoe element 284 applying the force 460 to the driven cam 228 via the first brake roller 230 and the second brake shoe element 286 applying the force 464 to the driven cam 228 and the forces 460 and 464 cooperating to rotatingly drive the driven cam 228 in the first direction of rotation 20. As the output shaft 14 is rotatingly driven in the first direction of rotation 20, the door member 16 is moved in the opening direction 22 (sometimes referred to herein as the "first direction 22") toward a fully opened position.

When the door member 16 is positioned or parked in an intermediate position generally between a fully opened position and a fully closed position and the input drive assembly 12 ceases to be rotatingly driven in either the first or the second direction of rotation 20 or 24, the brake drive assembly 15 operates to secure the door member 16 in the intermediate position since the brake drive assembly 15 is positioned in the braking mode in response to a force or torque applied at the output shaft 14. A force applied on the door member 14 via gravity tending to pull the door member 16 in the closing direction 26 (sometimes referred to herein as the "second direction 26") applies a force or torque on the output shaft 14 and the driven cam 228 connected thereto in the second direction of rotation 24. As the driven cam 228 starts to rotate in the second direction of rotation 24, the flat surface 380 contacts the first brake roller 230 resulting in the component forces 450 and 452 which are applied to the first brake shoe element 284 via the first brake roller 230 and move the first brake shoe element 284 into braking engagement with the brake surface 221 in the housing 62, and the flat surface 382 contacts the second brake roller 232 resulting in the component forces 454 and 456 which are applied to the second brake shoe element 286 via the second brake roller 232 and move the second brake shoe element 286 into braking engagement with the brake surface 221 in the housing 62. A force applied on the door member 16 in the closing direction 26 such as an individual pulling directly on the door member 16, for example, likewise results in the forces 450, 452, 454 and 456 being applied to the first and the second brake shoe elements 284 and 286 moving the first and the second brake shoe elements 284 and 286 into braking engagement with the brake surface 221 in the housing 62. A force applied on the door member 16 in the opening direction 22 tends to rotate the output shaft 14 and the driven cam 228 connected thereto in the first direction of rotation 20. As the driven cam 228 starts to rotate in the first direction of rotation 20, the flat surface 380 contacts the first brake roller 230 resulting in the component forces 458 and 460 which are applied to the first brake shoe element 284 via the first brake roller 230 and move the first brake shoe element 284 into braking engagement with the brake surface 221 in the housing 62, and the flat surface 382 contacts the second brake roller 232 resulting in the component forces 462 and 464 which are applied to the second brake shoe element 286 via the second brake roller 232 and move the second brake shoe element 286 into braking engagement with the brake surface 221 in the housing 62. Thus, any force applied to the door member 16 tending to move the door member 16 from the parked position (generally between the fully opened and the fully closed position) causes the first and the second brake shoe elements 284 and 286 to be moved into braking engagement with the brake surface 221 in the housing 62 thereby positioning the brake drive assembly 15 in the braking mode.

Further, with respect to the operational embodiment shown in FIG. 1, the door member 16 cannot be slammed against a surface in a closed position since the contact of the door member 16 with the surface results in a force or torque applied at the output shaft 14 which results in the brake drive assembly 15 being positioned in the braking mode. By the same token, the door member 16 cannot be driven past a fully opened position since the door member 16 will contact a surface as the door member 16 is driven past the fully opened position resulting in a force or a torque applied at the output shaft 14 which causes the brake drive assembly 15 to be positioned in the braking mode.

Assuming the brake drive assembly 15 is rotatingly driven in the second direction of rotation 24, the input shaft 60 and the brake ring 224 connected thereto are rotatingly driven in the second direction of rotation 24 to a position wherein a portion of the first flange 254 engages the contact surface 314 on the first brake shoe element 284 along a contact path 468 spaced a distance radially in a horizontal plane from the drive axis 64 substantially equal to the distance 432 (the first flange 254 being shown in FIG. 6 in dashed-lines in this position contacting the contact surface 314 along the contact path 468), and a portion of the second flange 262 engages the contact surface 320 on the second brake shoe element 286 along a contact path 466 spaced a distance radially in a horizontal plane from the drive axis 64 substantially equal to the distance 436 (the second flange 262 being shown in FIG. 6 in dashed-lines in this position contacting the contact surface 320 along the contact path 466). The engagement of the first flange 254 with the contact surface 314 results in a component force 470 acting on the first brake shoe element 284 in a direction tending to drive the first brake shoe element 284 in the second direction of rotation 24 and in a direction tending to collapse the first brake shoe element 284 toward the second brake shoe element 286 thereby moving the brake surface 364 in a direction generally away from the brake surface 221 in the housing 62. The engagement of the second flange 262 with the contact surface 320 results in a component force 472 acting on the second brake shoe element 286 in a direction tending to drive the second brake shoe element 286 in the second direction of rotation 24 and tending to collapse the second brake shoe element 268 toward the first brake shoe element 284 thereby moving the brake surface 366 in a direction generally away from the brake surface 221 in the housing 62. The forces 470 and 472 cooperate to collapse and to position the first and the second brake shoe elements 284 and 286 into the driving mode. As the brake shoe 226 is rotatingly driven in the second direction of rotation 24, the first brake roller 230 is retained with the chaneel 324 and a portion of the outer peripheral surface 410 of the first brake roller 230 contactingly engages the flat surface 380 of the driven cam 228 along a contact path substantially corresponding to the contact path 442 which is spaced the distance 444 radially in a horizontal plane from drive axis 64. The second brake roller 232 is retained within the channel 342 and a portion of the outer peripheral surface 424 of the second brake roller 232 contactingly engages the flat surface 382 of the driven cam 228 along a contact path substantially corresponding to the contact path 446 which is spaced the distance 448 radially in a horizontal plane from the drive axis 64. The brake shoe 226 drivingly rotates the driven cam 228 in the second direction of rotation 24 via the connection between the brake shoe 226 and the driven cam 228 provided via the first and the second brake rollers 230 and 232, the driven cam 228 rotatingly driving the output shaft 14 in the second direction of rotation 24.

When the brake drive assembly 15 is rotatingly driven in the second direction of rotation 24 and when the load on the driven cam 228 tends to drive cam 228 in the second direction of rotation 24, the load does not tend to back drive the brake drive assembly 15 in a direction generally opposed to the driving direction of rotation, i.e. the second direction of rotation 24. Assuming a force or a torque is applied to the driven cam 228 via the output shaft 14 in the first direction of rotation 20 tending to back drive the brake drive assembly 15, the back driving force in the first direction of rotation 20 results in a force applied to first brake shoe element 284 via the first brake roller 230, the force applied to the first brake roller 230 comprising the component forces 458 and 460 wherein the component force 460 acts in a direction generally parallel to the component force 438. By the same token, a force or a torque applied to the driven cam 228 in the first direction of rotation 20 results in a force applied to the second brake shoe element 286 via the second brake roller 232 comprising the component forces 454 and 456, the component force 456 acting in a direction generally parallel to the component force 440. In those applications where the load does back drive the brake drive assembly 15 in the first direction of rotation 20, the apparatus 10 is constructed such that the input torque applied via the input drive assembly 12 resulting in the forces 470 and 472 being applied to the first and the second brake shoe elements 284 and 286 are greater than the forces applied to the brake shoe 226 as a result of the load on the output shaft 14 such as the forces 460 and 464. Thus, the output shaft 14 continues to be rotatingly driven in the second direction of rotation 24 even though the load on the output shaft 14 results in forces applied to the first and the second brake shoe elements 284 and 286 in a direction which tends to move the first and the second brake shoe elements 284 and 286 toward braking engagement with the brake surface 221 in the housing 62. However, if the forces 460 and 464 exceed the forces 470 and 472, the first and the second brake shoe elements 284 and 286 will be moved into braking engagement with the brake surface 221 in the housing 62 thereby positioning the brake drive assembly 15 in the braking mode.

Referring again to the operational embodiment of the present invention shown in FIG. 1 and assuming the drive chain 18 is pulled in a direction causing the input drive assembly 12 to be rotatingly driven in the second direction of rotation 24, the input shaft 60 and the brake ring 224 connected thereto are rotatingly driven in the second driving direction 24 moving the first and the second flanges 254 and 262 into contacting engagement with the contact surfaces 314 and 320 and resulting in the forces 470 and 472 being applied to the first and the second brake shoe elements 284 and 286 collapsing the first and the second brake shoe elements 284 and 286 and moving the first and the second brake shoe elements 284 and 286 generally away from the brake surface 221 in the housing 62. The first and the second brake shoe elements 284 and 286 are rotatingly driven in the second direction of rotation 24 via the brake ring 224 and the rotating first and the second brake shoe elements 284 and 286 cooperate to rotatingly drive the driven cam 228 and the output shaft 14 connected thereto in the second direction of rotation 24, the first brake shoe element 284 applying the force 470 to the driven cam 228 via the first brake roller 230, the second brake shoe element 286 applying the force 472 to the driven cam 228, and the forces 470 and 472 cooperating to rotatingly drive the driven cam 228 in the second direction of rotation 24. As the output shaft 14 is rotatingly driven in the second direction of rotation 24, the door member 16 is moved in the closing direction 26 toward a fully closed position.

It is particularly significant to note that the distance 432 is greater than the distances 444 and the distance 436 is greater than the distance 448. If the distance 432 is less than the distance 444 and the distance 436 is less than the distance 448, a force or torque applied to the output shaft 14 in the second direction of rotation 24 resulting in a force applied to the first brake roller 230 along the contact path between the first brake roller 230 and the flat surface 380 of the driven cam 228 would result in a moment about the contact path between the first flange 254 and the contact surface 314 acting in a direction generally corresponding to the second direction of rotation 24. Further, the force or torque applied to the output shaft 14 in the second direction of rotation 24 resulting in a force applied to the second brake roller 232 along the contact path between the second brake roller 232 and the flat surface 382 of the driven cam 228 would result in a moment about the contact path between the second flange 262 and the contact surface 320 acting in a direction generally corresponding to the second direction of rotation 24. In this condition, the force or torque applied at the output shaft 14 in the second direction of rotation 24 results in moments about the contact paths between the first and the second flanges 254 and 262 and the contact surfaces 314 and 320 acting in directions generally corresponding to the force or torque applied at the output shaft 14, i.e. the second direction of rotation 24, thereby creating a condition wherein it is possible to rotatingly drive the brake drive assembly 15 in the second driving direction 24 in response to a force or torque applied at the output shaft 14 in the second direction of rotation 24 rather than being conditioned in the braking mode, a condition creating an unsafe brake drive assembly (a brake drive assembly which may not be positioned in the braking mode in response to a force or torque applied at the output shaft 14).

By the same token, if the distance 432 is less than the distance 444 and the distance 436 is less than the distance 448, a force or torque applied to the output shaft 14 in the first driving direction 20 resulting in a force applied to the first brake roller 230 along the contact path between the first brake roller 230 and the flat surface 380 of the driven cam 228 would result in a moment about the contact path between the first flange 254 and the contact surface 314 acting in a direction generally corresponding to the first direction of rotation 20. Further, the force or torque applied to the output shaft 14 in the first direction of rotation 20 resulting in a force applied to the second brake roller 232 along the contact path between the second brake roller 232 and the flat surface 382 of the driven cam 228 would result in a moment along the contact path between the second flange 262 and the contact surface 320 acting in a direction generally corresponding to the first direction of rotation 24. In this condition, the force or torque applied at the output shaft 14 in the first direction of rotation 20 results in moments about the contact paths between the first and the second flanges 254 and 262 and the contact surfaces 314 and 320 acting in directions generally corresponding to the force or torque applied at the output shaft 14, i.e. the first direction of rotation 20, thereby creating a condition wherein it is possible to rotatingly drive the brake drive assembly 15 in the first direction of rotation 20 in response to a force or torque applied at the output shaft 14 in the first direction of rotation 20 rather than being conditioned in the braking mode, a condition creating an unsafe brake (a brake drive assembly which may not be positioned in the braking mode in response to a force or torque applied at the output shaft 14).

As generally referred to before, the flat surfaces 356, 358, 360 and 362 reduce the area of the braking surface on the first and the second brake shoe elements 284 and 286. More particularly, the flat surface 356 intersects the brake surface 364 at an angle 480 from the first reference axis 338 and the flat surface 358 intersects the brake surface 364 at an angle 482 from the first reference axis 338, thereby providing a brake surface 364 extending arcuately through an angle 484 with respect to the drive axis 64, the angle 484 being equal to one-hundred and eighty degrees (180°) less the sum of the angles 480 and 482. Thus, at any rotational position of the first brake shoe element 284 within the housing 62, the portion of the brake surface 221 in the housing 62, which potentially is available for braking engagement with the brake surface 364 on the first brake shoe element 284, extends arcuately through an annular distance substantially equal to one-hundred and eighty degrees (180°). However, since the brake surfaces 221 and 364 are concentric with respect to the drive axis 64 and each extends arcuately about the drive axis 64, the first brake shoe element 284 tends to become wedged in the brake surface 221 formed in the housing 62 when the first brake shoe element 284 is moved into braking engagement with the brake surface 221. The wedging action between the brake surface 221 and the brake surface 364 of the first brake shoe element 284 tends to create a condition wherein additional force is required to move the first brake shoe element 284 from the braking mode to the driving mode, and the wedging action is increased as the braking surface 364 contact surface area is increased to extend over a larger arcuate distance, i.e. as the angle 484 is increased toward one-hundred eighty degrees (180°), the force required to move the first brake shoe element 284 from the braking mode to the driving mode being correspondingly increased.

Further, the portions of the braking surface 364, generally near the ends 292 and 294, travel through a greater distance as the first brake shoe element 284 moves from the driving mode into the braking mode as compared to the distance of travel through which the mid-portion of the brake surface 364, generally ninety degrees (90°) from either end 292 or 294 of the first brake shoe element 284, is moved from the driving mode into the braking mode. Thus, as the angle 484 through which the brake surface 364 extends is decreased or, in other words, as the brake surface 364 is decreased to extend through a smaller arcuate distance in the first and the second directions of rotation 20 and 24 from the mid-portion of the brake surface 364, the average distance traveled by the brake surface 364 as the first brake shoe element 284 is moved from the driving mode into the braking mode is decreased, i.e. there is less movement of the first brake shoe element 284 in moving from the driving mode into the braking mode, thereby increasing the efficiency of the brake drive assembly 15, the efficiency of the brake drive assembly 15 also being increased as a result of a decreased drag between the brake surface 364 and the brake surface 221 effected by reducing the brake surface 364 area by the flat surfaces 356 and 358. However, the reduction of the brake surface 364 begins to affect the structural integrity of the first brake shoe element 284 as the first brake shoe element 284 is cut-back in the vicinity of the channel 324. To some extent this limitation can be compensated for or offset by increasing the width of the first brake shoe element 284 generally between the end faces 288 and 290, or by increasing the radial distance between the inner peripheral surface 298 and the outer peripheral surface 296 of the first brake shoe element 284.

The flat surface 360 intersects the brake surface 366 at an angle 486 from the first reference axis 338 and the flat surface 362 intersects the brake surface 366 at an angle 488 from the first reference axis 338, thereby providing a brake surface 366 extending arcuately through an angle 490 with respect to the drive axis 64, the angle 490 being equal to one-hundred eighty degrees (180°) less the sum of the angles 486 and 488. Thus, at any rotational position of the second brake shoe element 286 within the housing 62, the portion of the brake surface 221 in the housing 62, which potentially is available for braking engagement with the brake surface 366 on the second brake shoe element 286, extends arcuately through an angular distance substantially equal to one-hundred eighty degrees (180°). However, since the brake surfaces 221 and 366 are concentric with respect to the brake drive axis 64 and each extends arcuately about the brake drive axis 64, the second brake shoe element 286 tends to become wedged in the brake surface 221 formed in the housing 62 when the second brake shoe element 286 is moved into braking engagement with the brake surface 221. The wedging action between the brake surface 366 of the second brake shoe element 286 tends to create a condition wherein additional force is required to move the second brake shoe element 286 from the braking mode into the driving mode, and the wedging action is increased as the braking surface 366 contact surface area is increased to extend over a larger arcuate distance, i.e. as the angle 490 is increased toward one-hundred eighty degrees (180°), the force required to move the second brake shoe element 286 from the braking mode into the driving mode being correspondingly increased.

Further, the portions of the brake surface 366, generally near the ends 304 and 306, travel through a greater distance as the second brake shoe element 286 moves from the driving mode into the braking mode as compared to the distance of travel through which the mid-portion of the brake surface 366, generally ninety degrees (90°) from either end 304 and 306 of the second brake shoe element 286, is moved from the driving mode into the braking mode. Thus, as the angle 490 through which the brake surface 366 extends is decreased or, in other words, as the brake surface 366 is decreased to extend through a smaller arcuate distance in the first and the second driving directions 20 and 24 from the mid-portion of the brake surface 366, the average distance traveled by the brake surface 366 as the second brake shoe element 286 is moved from the driving mode into the braking mode is decreased, i.e. there is less movement of the second brake shoe element 286 in moving from the driving mode into the braking mode, thereby increasing the efficiency of the brake drive assembly 15, the efficiency of the brake drive assembly 15 also being increased as a result of a decreased drag between the brake surface 366 and the brake surface 221 effected by reducing the brake surface 366 area by the flat surfaces 360 and 362. However the reduction of the brake surface 366 begins to affect the structural integrity of the second brake shoe element 286 as the second brake shoe element 286 is cut-back in the vicinity of the channel 342. To some extent this limitation can be compensated for or offset by increasing the width of the second brake shoe element 286 generally between the end faces 300 and 302, or by increasing the radial distance between the inner peripheral surface 310 and the outer peripheral surface 308 of the second brake shoe element 286.

It has also been found that the efficiency of the brake drive assembly 15 increases as the channel 324 is moved toward the mid-portion of the inner peripheral surface 298, i.e. toward the second reference axis 340, or, in other words, as the angle 336 approaches ninety degrees (90°), and the channel 342 is moved toward the mid-portion of the inner peripheral surface 310, i.e. toward the second reference axis 340, or, in other words, as the angle 354 approaches ninety degrees (90°). However, the locations of the channels 324 and 342 are limited by the design parameter that the distance 444 must be equal to or less than the distance 432 and the distance 448 must be equal to or less than the distance 436, for reasons described before.

The apparatus 10 is constructed to be operated in a lubricated condition with a lubricating fluid substantially filling the housing 62 opening 63. In most applications, the presence of a lubricating fluid within the housing 62 opening 63 has been found not to inhibit the parking engagement between the brake surface 221 and the brake surfaces 364 and 366 of the first and the second brake shoe elements 284 and 286. Further, it has been found that, as the first and the second brake shoe elements 284 and 286 are moved from the braking mode into the driving mode, a film of lubricating fluid develops over the brake surfaces 221, 364 and 366 which facilitates the operation of the brake assembly 15 in the driving mode, and the drag which may exist between the brake shoe 226 and the brake surface 221 in the housing 62 does not prevent the film of lubricating fluid from developing over the brake surface 221, 364 and 366. To assure proper operation to a greater degree, it has been found desirable in some applications to form spaced grooves 500 in the brake surfaces 364 and 366, each of the grooves 500 extending radially over the outer peripheral surface of one of the brake surfaces 364 and 366, the grooves 500 providing channels for receiving the lubricant as the first and the second brake shoe elements 284 and 286 are positioned in the braking mode. In this type of construction, some of the lubricating fluid on the brake surfaces 221, 364 and 366 is forced into and through the grooves 500 as the brake surfaces 221, 364 and 366 are moved into braking engagement. It should be noted that the grooves 500 can be formed in the housing 62 brake surface 221, if desired.

In summary, the apparatus 10 is constructed to have a load, such as the door member 16 and the associated components, for example, connected to the output shaft 14 and the input drive assembly 12 includes a portion connected to the input shaft 60 for applying a force or torque to the drive shaft 60 rotating the input shaft 60 in the first or the second direction of rotation 20 or 24. The rotation of the input shaft 60 is applied to the output shaft 14 for rotatingly driving the output shaft 14 in the first or the second directions of rotation 20 or 24 via the brake drive assembly 15. More particularly, the rotation of the input shaft 60 rotatingly drives the brake ring 224 connected thereto, the first and the second brake shoe elements 284 and 286 are rotatingly driven via the brake ring 224, and the brake shoe 226 rotatingly drives the output member 14 via the driven cam 228 connected to the output shaft 14 via the driven cam 228 key element 386 in the output shaft 14 slot 390, the brake shoe 226 applying force to the driven cam 228 via the first and the second brake rollers 230 and 232 which contactingly engage portions of the brake shoe 226 and the driven cam 228.

In the event a torque or load is applied to the output shaft 14 in excess of a predetermined design load or torque tending to drive the output shaft 14 and the driven cam 228 connected thereto in a direction generally opposed to the driving direction of rotation of the brake shoe 226, i.e. tending to back drive the brake drive assembly 15, the driven cam 228 applies forces to the first and the second brake shoe elements 284 and 286 via the first and the second brake rollers 230 and 232, respectively, moving the first and the second brake shoe elements 284 and 286 into braking engagement with the housing 62 brake surface 221, thereby positioning the first and the second brake shoe elements 284 and 286 in the braking mode. If the brake shoe 226 is not being rotatingly driven via the input drive assembly 12, then a force or torque applied to the output shaft 14 in either the first direction of rotation 20 or the second direction of rotation 24 will be applied to the first and the second brake shoe elements 284 and 286 by the driven cam 228 via the first and the second brake rollers 230 and 232 interposed between and contactingly engaging portions of the driven cam 228 and the brake shoe 226.

The input drive assembly 12, more particularly, comprises a chain driven, ball type drive assembly wherein the driving member 150 is connected to the chain connector 66 and supported for rotation about the brake drive axis 64. As the drive chain 18 is pulled in one direction, the chain connector 66 and the driving member 150 connected thereto are rotated in the first driving direction 20 and, as the drive chain 18 is pulled in the opposite direction, the chain connector 66 and the driving member 150 connected thereto are rotated in the second driving direction 24. The rotation of the driving member 150 is applied to the driven member 130 via the balls 194 contactingly engaging the bearing surfaces 112, 146, 160 and 164, thereby rotatingly driving the driven member 130. The bearing surfaces 112, 146, 160 and 164 are disposed and oriented, and the balls 194 are sized such that the driven member 130 is rotated in the same direction as the driving member 150 and such that the driven member 130 is rotated at a reduced rate of speed as compared to the rotational rate of speed of the driving member 150, in one preferred embodiment as described before with reference to the construction of one such ball drive assembly. The driven member 130 is connected to and rotatingly drives the drive shaft 60.

Figure 7:
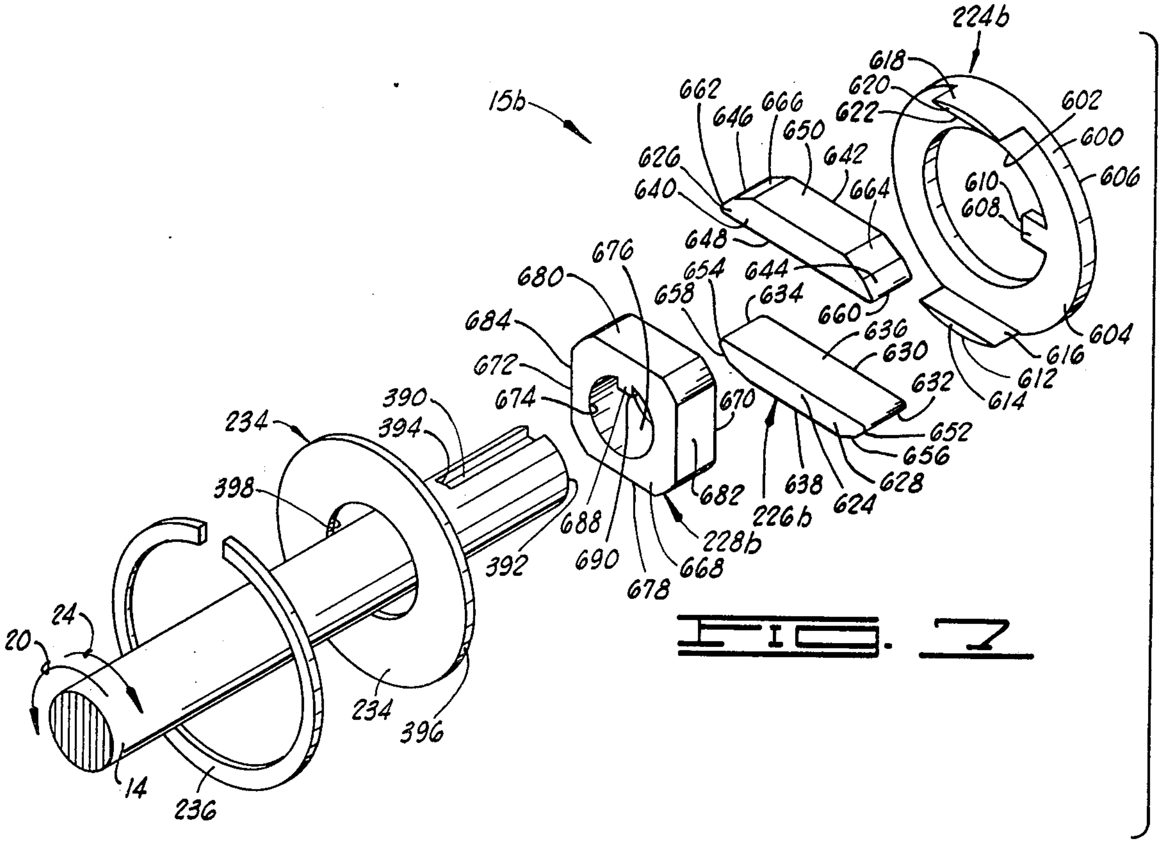
FIG. 7 is an exploded view, similar to FIG. 3, but showing a modified brake drive assembly.
Figure 8:
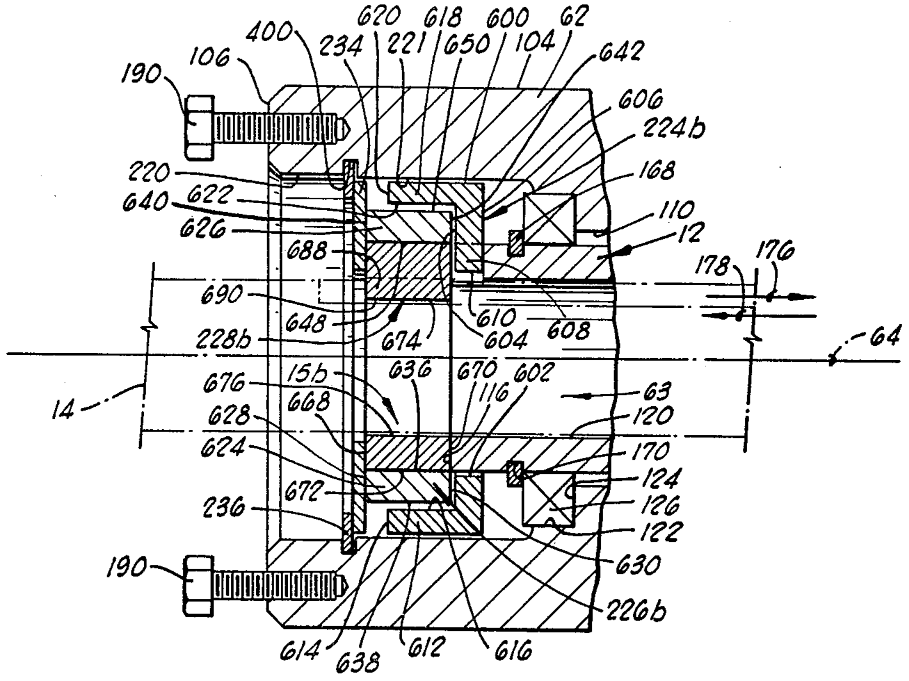
FIG. 8 is a sectional view, similar to FIG. 2, but showing the modified brake drive assembly of FIG. 7.
Figure 9:
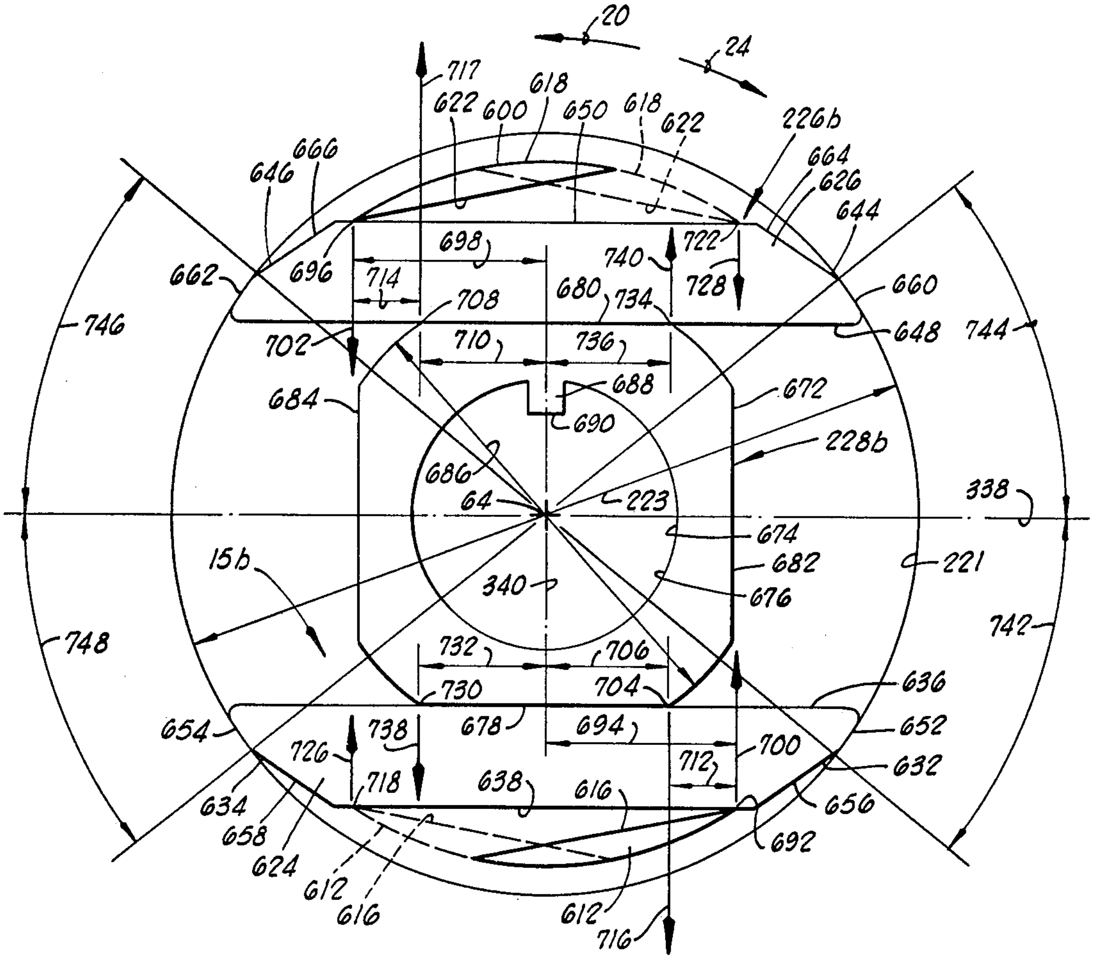
FIG. 9 is an enlarged diagrammatic view, similar to FIG. 6, but showing the modified brake drive assembly of FIGS. 7 and 8.

Embodiment of FIGS. 7, 8 and 9

A modified brake drive assembly 15*b* is shown in FIGS. 7, 8 and 9 and, in general, the brake assembly 15*b* includes: a modified brake ring 224*b*; a modified brake shoe 226*b*; and a modified driven cam 228*b*. The brake drive assembly 15*b* is disposed in the housing 62 opening 63 and is disposed between a modified input shaft 60*b* and the output shaft 14 to provide the driving connection or coupling therebetween so the output shaft 14 is rotatingly driven in the first and the second directions of rotation 20 and 24 via the input shaft 60*b*, the input shaft 60*b* being rotatingly driven by the input drive assembly 12 in a manner described in detail before with respect to the brake drive assembly 15. The brake drive assembly 15*b* also provides a coupling between the output shaft 14 and the input drive assembly 12 operating to prevent the rotation of the output shaft 14 in response to a torque applied at the output shaft 14 in a manner described in detail before with respect to the brake drive assembly 15.

The brake ring 224*b* is generally circularly shaped having an outer peripheral surface 600, an opening 602 formed through a central portion thereof, a first face 604 and a second face 606. One end of a key element 608 is connected to a portion of the inner peripheral surface formed by the opening 602 in the brake ring 224*b* and the key element 608 extends a distance radially inwardly terminating with an outermost end 610. One end of a first flange 612 is connected to the first face 604 and the first flange 612 extends a distance generally perpendicularly from the first face 604 terminating with an outermost end 614, the first flange 612 providing a substantially flat first surface 616 extending a distance axially from the brake ring 224*b* generally in the second axial direction 177. One end of a second flange 618 is connected to the first face 604 and the second flange 618 extends a distance generally perpendicularly from the first face 604 terminating with an outermost end 620, the second flange 618 providing a substantially flat first surface 622 extending a distance axially from the brake ring 224*b* generally in the second axial direction 177. The first flange 612 is generally disposed one hundred eighty degrees (180°) from the second flange 618 and, more particularly, the first surface 616 of the first flange 612 is generally disposed one hundred eighty degrees (180°) from the first surface 622 of the second flange 618.

The brake ring 224*b* is disposed on the input shaft 60, generally near the end 116 thereof, and one end portion of the input shaft 60, generally near the end 116, is inserted through the opening 602 in the brake ring 224*b*. In the assembled position of the brake ring 224*b* and the input shaft 60, the key element 608 of the brake ring 224*b* is disposed in the slot 270 in the input shaft 60 to a position wherein the key element 246 abuts the end wall 272 thereby limiting the movement of the brake ring 224*b* on the input shaft 60 in the first axial direction 176. The brake ring 224*b* is connected to the input shaft 60 so the brake ring 224*b* is drivingly rotated in the first and the second driving directions 20 and 24 by the input shaft 60 during the operation of the apparatus 10, and the first and the second flanges 612 and 618 each extend a distance axially beyond the end 116 of the input shaft 60 in the assembled position of the brake ring 224*b* on the input shaft 60. In one form, the brake ring 224*b* can be welded to the input shaft 60, if preferred in some applications.

The brake shoe 226*b* comprises a first brake shoe element 624 and a second brake shoe element 626, the first and the second brake shoe element 624 and 626 being similarly constructed. In a preferred embodiment, the first and the second brake shoe elements 624 and 626 are identical and interchangeable. The first brake shoe element 624 is generally rectangularly or bar shaped having opposite end faces 628 and 630, opposite ends 632 and 634, a substantially flat inner surface 636 and a substantially flat outer surface 638. The second brake shoe element 626 is generally rectangularly or bar shaped having opposite end faces 640 and 642, opposite ends 644 and 646, a substantially flat inner surface 648 and a substantially flat outer surface 640. The outer surface 638 of the first brake shoe element 624 is disposed and oriented to provide a contact surface, and the outer surface 650 of the second brake shoe element 626 is disposed and oriented to provide a contact surface, the outer surfaces 638 and 650 being sometimes referred to herein as the "contact surfaces" 638 and 650.

A curved portion formed on a portion of the end 632 of the first brake shoe element 624 and extending a distance generally between the inner surface 636 and the contact surface 638 forms a brake surface 652. A curved portion formed on a portion of the end 634 of the first brake shoe element 624 and extending a distance generally between the inner surface 636 and the contact surface 638 forms a brake surface 654. In an assembled position of the first and the second brake shoe elements 624 and 626, the brake surfaces 652 and 654 cooperate to form a portion of the brake surface of the brake shoe 226*b*. A portion 656 of the end 632, extending generally between the brake surface 652 and the inner surface 636, is tapered inwardly, and a portion 658 of the end 634, extending between the brake surface 654 and the inner surface 636, is tapered inwardly. More particularly, the portions 656 and 658 of the first brake shoe element 624 are each tapered inwardly so that the portions 656 and 658 do not engage the brake surface 221 in the braking mode thereby reducing the contact surface area of the brake surfaces 656 and 654 formed on the first brake shoe element 626.

A curved portion formed on the end 644 of the second brake shoe element 626 and extending a distance generally between the inner surface 648 and the contact surface 650 forms a brake surface 660. A curved portion formed on a portion of the end 646 of the second brake shoe element 626 and extending a distance generally between the inner surface 648 and the contact surface 650 forms a brake surface 662. In an assembled position of the first and the second brake shoe elements 624 and 626, the brake surfaces 660 and 662 cooperate to form a portion of the brake surface of the brake shoe 226*b*. A portion 664 of the end 644, extending generally between the brake surface 660 and the inner surface 648, is tapered inwardly, and a portion 666 of the end 646, extending between the brake surface 662 and the inner surface 636, is tapered inwardly. More particularly, the portions 664 and 666 of the second brake shoe element 626 are each tapered inwardly so the portions 664 and 666 do not engage the brake surface 221 in the braking mode thereby reducing the contact surface area of the brake surfaces 660 and 662 formed on the second brake shoe element 626.

The driven cam 228*b* is generally cylindrically shaped having opposite end faces 668 and 670, an outer peripheral surface 672 and an opening 674 extending axially through a central portion of the driven cam 228*b* intersecting the end faces 668 and 670 and forming an inner peripheral surface 676. A first flat surface 678 is formed on a portion of the outer peripheral surface 672, a second flat surface 680 is formed on a portion of the outer peripheral surface 672, and a pair of side flat surfaces 682 and 684 (sometimes referred to as the "third flat surface" 682 and the "fourth flat surface" 684) are formed on portions of the outer peripheral surface 672. The first and the second flat surfaces 678 and 680 are generally disposed on the outer peripheral surface 672 and the side flat surfaces 682 and 684 are generally oppositely disposed on the outer peripheral surface 672. The outer peripheral surface 672 of the driven cam 228*b* has a diameter 686 and the driven cam 228*b* is supported in an assembled position such that the outer peripheral surface 672 extends concentrically about the drive axis 64.

One end of a key element 688 is connected to the inner peripheral surface 676 of the driven cam 228*b* and the key element 676 extends a distance generally radially inwardly terminating with an outermost end 690. In an assembled position, a portion of the output member 14 generally near the end 392 extends through the housing 62 opening 63 and the key element 688 on the driven cam 228*b* is disposed in the slot 390 in the output shaft 14 thereby connecting the driven cam 228*b* to the output shaft 14 in a manner and for reasons similar to that described before with respect to the driven cam 228 so the rotation of the driven cam 228*b* drivingly rotates the output shaft 14 in the first and the second directions of rotation 20 and 24.

In the assembled position of the apparatus 10, the input shaft 60 is rotatingly supported by the bearing member 126 for rotation about the drive axis 64 with a portion of the input shaft 60, generally near the end 116 thereof, extending a distance axially into the housing 62 opening 63, the retaining rings 168 and 172 cooperating to axially retain the input shaft 60 in an assembled position. The brake ring 224 is connected to the input shaft 60 via the brake ring 224*b* key element 246 which is retainingly disposed in the input shaft 60 slot 270, the first and the second flanges 612 and 618 extending a distance axially from the end 116 of the input shaft 60 generally in the second axial direction 177. The diameter of the outer peripheral surface 660 of the brake ring 224*b* is less than the diameter 223 of the annular brake surface 221 to provide a clearance between the outer peripheral surface 660 of the brake ring 224*b* and the brake surface 221, thereby allowing the brake ring 224*b* to be drivingly rotated by the input shaft 60 in the first and the second directions of rotation 20 and 24.

The output shaft 14 is inserted into the housing 62 opening 63 and through the bore 120 in the input shaft 60, the output shaft 14 being rotatable in the first and the second directions of rotation 20 and 24 within the bore 120 of the input shaft 60 in a manner described before with respect to the brake assembly 15.

The driven cam 228*b* is disposed on and connected to the output shaft 14 generally near the end 392 thereof, a portion of the output shaft 14 being inserted through the opening 674 of the driven cam 228*b* and the driven cam 228*b* being oriented such that the key element 688 is retainingly disposed in a portion of the slot 390 in the output shaft 14 thereby connecting the driven cam 228*b* to the output shaft 14. The key element 674 and slot 390 connection between the driven cam 228b and the output shaft 14 positions the driven cam 228b in a predetermined circumferential position on the output shaft 14 and the abutment between the key element 674 and the end wall 394 formed in the output shaft 14 by the slot 390 limits the movement of the driven cam 228b along the output shaft 14 in the second axial direction 177 thereby positioning the driven cam 228b in a predetermined position on the output shaft 14 in one axial direction. The cover 234 is disposed in the housing 62 opening 63 and positioned therein such that a portion of the cover 234 engages a portion of the end face 668 of the driven cam 228b and the cover 234 is secured in an assembled position via the retaining ring 236 which engages a portion of the cover 234 and secures the cover 234 between the retaining ring 236 and the driven cam 228b.

The driven cam 228b is disposed between the inner surfaces 636 and 648 of the first and the second brake shoe elements 624 and 626, respectively, and the driven cam 228b is oriented such that the first flat surface 678 is disposed generally adjacent the inner surface 648 of the second brake shoe element 626 and the lower flat surface 680 is disposed generally adjacent the inner surface 636 of the second brake shoe element 626. In the assembled position with the driven cam 228b disposed between the first and the second brake shoe elements 624 and 626, the end face 670 of the driven cam 228b is substantially aligned with the end faces 630 and 624 of the first and the second brake shoe elements 624 and 626 and the end face 668 of the driven cam 228b is substantially aligned with the end faces 628 and 640 of the first and the second brake shoe elements 624 and 626.

During the operation and assuming the input drive assembly 12 (shown in FIG. 2, 4 and 5, and described before) is drivingly rotating the input shaft 60 in the first direction of rotation 20, the brake ring 224b is rotatingly driven in the first direction of rotation 20 via the key element 688 connection between the brake ring 224b and the input shaft 60 to a position wherein a portion of the brake ring 224b first flange 612 engages the contact surface 638 formed on the first brake shoe element 624 along a contact path 692 spaced a distance 694 radially outwardly from the drive axis 64, and a portion of the brake ring 224b second flange 618 approximately simultaneously engages the contact surface 650 formed on the second brake shoe element 626 along a contact path 696 spaced a distance 698 radially outwardly in a horizontal plane from the drive axis 64 in a generally opposite direction with respect to the contact path 692 and the distance 694. The engagement of the first flange 612 with the contact surface 638 results in a component force 700 acting on the first brake shoe element 624 generally along the contact path 692 at a position spaced the distance 694 from the drive axis 64 in a direction generally from the first brake shoe element 624 toward the second brake shoe element 626 tending to drive the first brake shoe element 624 in the first driving direction 20 and in a direction tending to collapse the first brake shoe element 624 toward the second brake shoe element 626 thereby moving the brake surfaces 652 and 654 in a direction generally away from the brake surface 221 formed in the housing 62. The engagement of the second flange 612 with the contact path 696 results in a component force 702 acting on the second brake shoe element 626 generally along the contact path 696 at a position spaced the distance 698 from the drive axis 64 in a direction generally from the second brake shoe element 626 toward the first brake shoe element 624 tending to drive the second brake shoe element 626 in the first direction of rotation 20 and tending to collapse the second brake shoe element 626 toward the first shoe element 624 thereby moving the brake surfaces 660 and 662 in a direction generally away from the brake surface 221 formed in the housing 62. The forces 700 and 702 cooperate to collapse and to position the first and the second brake shoe elements 624 and 626 in the driving mode wherein the brake surfaces 652, 654, 664 and 666 are biased in a direction generally away from the brake surface 221 allowing the first and the second brake shoe elements 624 and 626 to be rotatingly driven in the first direction of rotation 20 via the engagement between the brake ring 224b and the brake shoe 226b, i.e. the engagement between the first and the second flanges 612 and 618 and the contact surfaces 638 and 650, respectively.

As the brake shoe 226b is rotatingly driven in the first direction of rotation 20, the first brake shoe element 624 contactingly engages the first flat surface 678 of the driven cam 228b along a contact path 704 spaced a distance 706 radially outwardly in a horizontal plane from the drive axis 64. The second brake shoe element 626 contactingly engages the second flat surface 680 of the driven cam 228b along a contact path 708 spaced a distance 710 radially outwardly in a horizontal plane from the drive axis 64. The brake shoe 226b drivingly rotates the driven cam 228b in the first direction of rotation 20 via the contacting engagement between the brake shoe 226b and the driven cam 228b, and the driven cam 228b rotatingly drives the output shaft 14 in the first direction of rotation 20 via the connection therebetween provided via the key element 688 on the driven cam 228b disposed in the slot 390 in the output shaft 14, in a manner similar to that described before with respect to the brake drive assembly 15.

The distance 694 is greater than the distance 706, and the distance 698 is greater than the distance 710, the difference between the distances 694 and 706 being a distance 712 and the difference between the distances 698 and 710 being a distance 714. Assuming the load on the output shaft 14 and applied to the driven cam 228b acts on the driven cam 228b in a direction generally opposed to the driving direction, then the load on the output shaft 14 will tend to back drive the brake drive assembly 15b. Thus, assuming the driven cam 228 is rotatingly driven in the first direction of rotation 20, and the load on the driven cam 228b tends to back drive the brake drive assembly 15b in the second direction of rotation 24, and, assuming the load on the output shaft 14 acts in the first direction of rotation 20, when the driven cam 228b is rotatingly driven in the second direction of rotation 24, the load on the driven cam 228b tends to back drive the brake drive assembly 15b in the first direction of rotation 20.

Assuming the brake drive assembly 15b is rotatingly driven in the first direction of rotation 20 and the load on the driven cam 228b tends to back drive the driven cam 228b in the second direction of rotation 24, the load on the driven cam 228b or, in other words, the load on the output shaft 14 causes the first flat surface 678 to contactingly engage the first brake shoe element 624 resulting in a force applied to the first brake shoe element 624 in a direction generally parallel to the component force 700, thereby producing a moment about the contact path 692 in a direction generally corresponding to the driving direction of rotation, i.e. the first direction of rotation 20. By the same token and in this condition, the load on the driven cam 228*b* tending to back drive the driven cam 228*b* in the second direction of rotation 24 causes the flat surface 680 to contactingly engage the second brake shoe element 626 resulting in a force applied to the second brake shoe element 626 in a direction generally parallel to the component force 702, thereby producing a moment about the contact path 704 in a direction generally corresponding to the driving direction of rotation, i.e. the first direction of rotation 20.

When the input drive assembly 12 ceases to be rotatingly driven, the forces 700 and 702 are substantially zero. In this condition and assuming a force or a load is applied to the output shaft 14 and the driven cam 228*b* connected thereto in a manner tending to rotate the driven cam 228*b* in the second direction of rotation 24, the forces 714 and 716 are applied to the first and the second brake shoe elements 624 and 626 which force the first and the second brake shoe elements 624 and 626 into braking engagement with the brake surface 221 of the housing 62, thereby positioning the brake assembly 156 in the braking mode. In this condition and assuming a load or force is applied to the output shaft 14 and the driven cam 228*b* connected thereto in a manner tending to rotate the driven cam 228*b* in the first direction of rotation 20, the first flat surface 678 contactingly engages the first brake shoe element 624 and applies a force to the first brake shoe element 624 and the second flat surface 680 contactingly engages the second brake shoe element 626 and applies a force to the second brake shoe element 626, the forces 714 and 716 cooperating and acting on the first and the second brake shoe elements 624 and 626 in a direction moving the first and the second brake shoe elements 624 and 626 into braking engagement with the brake surface 221 of the housing 62 and positioning the brake drive assembly 15 in the braking mode. Thus, when the input drive assembly 12 is not rotatingly driven, a force or a load applied on the output shaft 14 and the driven cam 228*b* in either the first or the second driving directions 20 or 24 results in a force applied to the first and the second brake shoe elements 624 and 626 moving the first and the second brake shoe elements 624 and 626 into braking engagement with the brake surface 221 of the housing 62 and positioning the brake drive assembly 15*b* in the braking mode.

Assuming the brake drive assembly 15*b* is rotatingly driven in the second direction of rotation 24, the input shaft 60 and the brake ring 224*b* connected thereto are rotatingly driven in the second direction of rotation 24 to a position wherein a portion of the first flange 612 engages the contact surface 638 on the first brake shoe element 624 along a contact path 718 spaced a distance radially in a horizontal plane from the drive axis 64 substantially equal to the distance 694 (the first flange 254 being shown in FIG. 9 in dashed-lines in this position), and a portion of the second flange 618 engages the contact surface 650 on the second brake shoe element 626 along a contact path 722 spaced a distance radially in a horizontal plane from the drive axis 64 substantially equal to the distance 696 (the second flange 618 being shown in FIG. 9 in dashed-lines in this position). The engagement of the first flange 612 with the contact surface 638 results in a component force 726 acting on the first brake shoe element 624 in a direction tending to drive the first brake shoe element 624 in the second direction of rotation 24 and in a direction tending to collapse the first brake shoe element 624 toward the second brake shoe element 626 thereby moving the brake surfaces 652, 654, 660 and 662 in a direction generally away from the brake surface 221 in the housing 62. The engagement of the second flange 618 with the contact surface 650 results in a component force 728 acting on the second brake shoe element 626 in a direction tending to drive the second brake shoe element 626 in the second direction of rotation 24 and tending to collapse the second brake shoe element 626 toward the first brake shoe element 624 thereby moving the brake surfaces 652, 654, 660 and 662 in a direction generally away from the brake surface 221 in the housing 62. The forces 726 and 728 cooperate to collapse and to position the first and the second brake shoe elements 624 and 626 into the driving mode. As the brake shoe 226*b* is rotatingly driven in the second direction of rotation 24, the first brake shoe element 624 contactingly engages the first flat surface 678 of the driven cam 228*b* along a contact path 730 which is spaced a distance 732 radially in a horizontal plane from the drive axis 64 substantially corresponding to the distance 706. The second brake shoe element 626 contactingly engages the second flat surface 680 of the driven cam 228*b* along a contact path 734 which is spaced a distance 736 radially in a horizontal plane from the drive axis 64 substantially corresponding to the distance 710. The brake shoe 226*b* drivingly rotates the driven cam 228*b* in the second direction of rotation 24 via the contacting engagement between the brake shoe 226*b* and the driven cam 228*b*, the driven cam 228*b* rotatingly driving the output shaft 14 in the second direction of rotation 24.

When the brake drive assembly 15*b* is rotatingly driven in the second direction of rotation 24 and when the load on the driven cam 228*b* tends to drive the driven cam 228*b* in the second direction of rotation 24, the load does not tend to back drive the brake drive assembly 15*b* in a direction generally opposed to the driving direction of rotation, i.e. the second direction of rotation 24. Assuming a force or a torque is applied to the driven cam 228*b* via the output shaft 14 in the first direction of rotation 20 tending to back drive the brake drive assembly 15*b*, the back driving force in the first direction of rotation 20 results in a force applied to the first brake shoe element 624 via the driven cam 228*b*. By the same token, a force or a torque applied to the driven cam 228*b* in the first direction of rotation 20 results in a force applied to the second brake shoe element 626 via the driven cam 228*b* in a direction generally parallel to the component force 702. In those applications where the load does back drive the brake drive assembly 15*b* in the first direction of rotation 20, the brake drive assembly 15*b* is constructed such that the input torque applied via the input drive assembly 12 resulting in the forces 738 and 740 being applied to the first and the second brake shoe elements 624 and 626 are greater than the forces applied to the brake shoe 226*b* as a result of the load on the output shaft 14. Thus, the output shaft 14 continues to be rotatingly driven in the second direction of rotation 24 even though the load on the output shaft 14 results in forces applied to the first and the second brake shoe elements 624 and 626 in a direction which tends to move the first and the second brake shoe elements 624 and 626 toward braking engagement with the brake surface 221 in the housing 62.

It is particularly significant to note that the distance 694 is greater than the distance 706 and the distance 698 is greater than the distance 710, for reasons described in detail before with respect to the brake drive assembly 15. As the distances 712 and 714 are increased, the efficiency of the brake drive assembly 15b decreases, for reasons described before with respect to the brake drive assembly 15.

Further, the brake surface 652 of the first brake shoe element 624 extends from the inner surface 636 terminating with the portion 656, the termination of the brake surface 652 being oriented at an angle 742 from the first reference axis 338. The brake surface 660 of the second brake shoe element 626 extends from the inner surface 648 terminating with the portion 664, the termination of the brake surface 660 being oriented at an angle 774 from the first reference axis 338. The brake surface 662 of the second brake shoe element 626 extends from the inner surface 648 terminating with the portion 646, the termination of the brake surface 662 being oriented at an angle 746 from the first reference axis 338. The brake surface 654 of the first brake shoe element 624 extends from the inner surface 636 terminating with the portion 658, the termination of the brake surface 654 being oriented at an angle 748 from the first reference axis 338.

In a preferred embodiment, the angles 742, 744, 746 and 748 are substantially equal. The larger the angles 742, 744, 746 and 748 the smaller the force required to move the brake drive assembly 15b from the braking mode and, if the angles 742, 744, and 746 and 748 are too small, the first and the second brake shoe elements 624 and 626 might wedge in the housing 62 in the braking mode. In one preferred embodiment with the brake drive assembly 15b disposed in the housing 62, the angles 742, 744, 746 and 748 are each generally between thirtyfive degrees (35°) and forty-five degrees (45°).

Changes may be made in the construction and the arrangement of the various assemblies, parts or elements of the embodiments disclosed herein without departing from the spirit and the scope of the invention as defined in the following claims.

What is claimed is:

1. An apparatus for moving a door member in an opening direction and in a closing direction, comprising:

- a housing having a brake surface formed in a portion thereof;
- a brake shoe having a brake surface engageable with the brake surface in the housing in a braking mode, the brake shoe comprising:
  - a first brake shoe element having a brake surface formed on a portion thereof engageable with the housing brake surface in the braking mode; and
  - a second brake shoe element having a brake surface formed on a portion thereof engageable with the housing brake surface in the braking mode, the brake surfaces on the first and the second brake shoe elements providing the brake surface of the brake shoe;
- means engageable with the first brake shoe element and the second brake shoe element for rotatingly driving the first and the second brake shoe elements in a first direction of rotation and in a second direction of rotation about a drive axis in a driving mode;
- an output shaft having a portion disposed between the first brake shoe element and the second brake shoe element;
- a driven cam disposed near the first and the second brake shoe elements, the output shaft being connected to the driven cam and the output shaft being engageable with the first and the second brake shoe elements via the driven cam;
- means having a portion disposed between and engageable with the first brake shoe element and the driven cam and a portion disposed between and engageable with the second brake shoe element and the driven cam, the first brake shoe element and the second brake shoe element applying a force to the driven cam via said means for rotatingly driving the driven cam in a driving mode, the rotation of the driven cam rotating the output shaft in the first direction of rotation and in the second direction of rotation, and the output shaft applying a force to the first and the second brake shoe elements via the driven cam for positioning the first and the second brake shoe elements in the braking mode in response to a force applied to the output shaft; and
- a door member connected to the output shaft and being movable in an opening direction in response to the output shaft being rotated in the first direction of rotation and being movable in a closing direction in response to the output shaft being rotated in the second direction of rotation.

2. The apparatus of claim 1 wherein the first brake shoe element includes an inner peripheral surface; and wherein the second brake shoe element includes an inner peripheral surface; and wherein the driven cam is defined further as including an outer peripheral surface, the outer peripheral surface of the driven cam being generally concentric with the inner peripheral surfaces of the first and the second brake shoe elements, and the outer peripheral surface of the driven cam and the inner peripheral surfaces of the first and the second brake shoe elements each having centerline axis generally corresponding to the drive axis.

3. The apparatus of claim 1 wherein the brake surfaces of the first and the second brake shoe elements are each defined further as having a centerline axis generally corresponding to the drive axis, and wherein the brake surface formed in the housing is defined further as having a centerline axis generally corresponding to the drive axis.

4. The apparatus of claim 1 wherein the driven cam is defined further as being engageable with the first brake shoe element at a position spaced a distance radially in a horizontal plane from the drive axis; and wherein the means for rotatingly driving the first and the second brake shoe elements is defined further as being engageable with the first brake shoe element at a position spaced a distance radially in the horizontal plane from the drive axis, the radial distance between the drive axis and the position of engagement between the first brake shoe element and the means for rotatingly driving the first and the second brake shoe elements being greater than the radial distance between the drive axis and the position of engagement between the first brake shoe element and the drive cam.

5. The apparatus of claim 1 wherein the drive cam is defined further as being engageable with the first brake shoe element at a position spaced a distance radially in a horizontal plane from the drive axis and engageable with the second brake shoe element at a position spaced a distance radially in the horizontal plane from the drive axis; and wherein the means for rotatingly driving the first and the second brake shoe elements is defined further as being engageable with the first brake shoe element at a position spaced a distance radially in a horizontal plane from the drive axis, the radial distance between the drive axis and the position of engagement between the first brake shoe element and the means for rotatingly driving the first and the second brake shoe elements being greater than the radial distance between the drive axis and the position of engagement between the first brake shoe element and the driven cam, and as being engageable with the second brake shoe element at a position spaced a distance radially from the drive axis greater than the radial distance between the drive axis and the position of engagement between the second brake shoe element and the driven cam.

6. The apparatus of claim 2 wherein the first brake shoe element is defined further as including opposite ends and an outer peripheral surface extending generally between the opposite ends; and wherein the second brake shoe element is defined further as including opposite ends and an outer peripheral surface extending generally between the opposite ends, one end of the second brake shoe element being disposed near one end of the first brake shoe element and the opposite end of the second brake shoe element being disposed near the other end of the first brake shoe element in an assembled position of the first and the second brake shoe elements.

7. The apparatus of claim 6 wherein the first brake shoe element includes a brake surface formed on a portion of the outer peripheral surface thereof; and wherein the second brake shoe element includes a brake surface formed on a portion of the outer peripheral surface thereof, the brake surfaces on the first and the second brake shoe elements cooperating to provide the brake surface on the brake shoe.

8. The apparatus of claim 6 wherein one of the ends of the first brake shoe element abuts one end of the second brake shoe element and the opposite end of the first brake shoe element abuts the other end of the second brake shoe element in the driving mode, the brake surfaces of the first and the second brake shoe elements being generally spaced a distance from the brake surface in the housing in the driving mode and the brake surfaces of the first and the second brake shoe elements each engaging the brake surface in the housing substantially preventing further rotational movement of the first and the second brake shoe elements in the braking mode.

9. The apparatus of claim 6 wherein the driven cam includes an outer peripheral surface; and wherein the brake shoe includes an opening forming an inner peripheral surface; and wherein the first brake shoe element includes an inner peripheral surface; and wherein the second brake shoe element includes an inner peripheral surface, the inner peripheral surfaces of the first and the second brake shoe elements cooperating to provide the inner peripheral surface of the brake shoe in an assembled position; and wherein the apparatus is defined further to include:

means disposed between the first and the second brake shoe elements and the driven cam having a portion disposed between the inner peripheral surface of the first brake shoe element and the outer peripheral surface of the driven cam, the driven cam applying a force to the first brake shoe element via said means in response to a torque applied to the driven cam for moving the first brake shoe element in a direction generally toward the brake surface in the housing to a position wherein the brake surface of the first brake shoe element engages the brake surface in the housing substantially preventing further rotational movement of the first brake shoe element, and a portion disposed between the inner peripheral surface of the second brake shoe element and the outer peripheral surface of the driven cam, the driven cam applying a force to the second brake shoe element via said means in response to a torque applied to the driven cam moving the second brake shoe element in a direction generally toward the brake surface in the housing to a position wherein the brake surface of the second brake shoe element engages the brake surface in the housing substantially preventing further rotational movement of the second brake shoe element.

10. The apparatus of claim 9 wherein the means disposed between the first and the second brake shoe elements and the driven cam is defined further to include:

a first brake roller disposed between the outer peripheral surface of the driven cam and the inner peripheral surface of the first brake shoe element, a portion of the first brake shoe element and a portion of the driven cam being engageable with the first brake roller, the first brake shoe element applying a force to the driven cam via the first brake roller for rotatingly driving the driven cam in a driven position of the first and the second brake shoe elements and the driven cam applying a force to the first brake shoe element via the first brake roller in response to a torque applied to the driven cam for positioning the first brake shoe element in the braking mode wherein the brake surface on the first brake shoe element engages the brake surface in the housing; and a second brake roller disposed between the outer peripheral surface of the driven cams and the inner peripheral surface of the second brake shoe element, a portion of the second brake shoe element and a portion of the driven cam being engageable with the second brake roller, the second brake shoe element applying a force to the driven cam via the second brake roller for rotatingly driving the driven cam in a driven position of the first and the second brake shoe elements and the driven cam applying a force to the second brake shoe element via the second brake roller in response to a torque applied to the driven cam for positioning the second brake shoe element in the braking mode wherein the brake surface on the second brake shoe element engages the brake surface in the housing.

11. The apparatus of claim 10 wherein the first brake shoe element includes a channel formed in the inner peripheral surface thereof and extending a distance axially therethrough; and wherein the second brake shoe element includes a channel formed in the inner peripheral surface thereof and extending a distance axially therethrough; and wherein the first brake roller is defined further as generally cylindrically shaped and a portion of the first brake roller being disposed in the channel in the first brake shoe element and portions of the first brake shoe element formed via the channel therein cooperating to retain the first brake roller partially disposed within the channel in the first brake shoe element; and wherein the second brake roller is defined further as being generally cylindrically shaped and a portion of the second brake roller being disposed in the channel in the second brake shoe element and portions of the second brake shoe element formed via the channel therein cooperating to retain the second brake roller partially disposed within the channel in the second brake shoe element.

12. The apparatus of claim 11 wherein the driven cam is defined further as including a pair of surfaces formed on a portion of the outer peripheral surface of the driven cam, one of the surfaces being disposed generally opposite the channel in the first brake shoe element and cooperating therewith to provide a first open space, the first brake roller being disposed generally in the first open space and partially disposed within the channel in the first brake shoe element, a portion of the first brake roller being engageable with portions of the first brake shoe element formed via the channel in the first brake shoe element and engageable with the surface formed on the driven cam and disposed generally opposite the channel in the first brake shoe element, and the other surface on the driven cam being disposed generally opposite the channel in the second brake shoe element and cooperating therewith to provide a second open space, the second brake roller being disposed generally in the second open space and partially disposed within the channel in the second brake shoe element, a portion of the second brake roller being engageable with portions of the second brake shoe element via the channel in the second brake shoe element and engageable with the surface formed on the driven cam and disposed generally opposite the channel in the second brake shoe element.

13. The apparatus of claim 12 wherein the first brake roller engages one of the surfaces on the driven cam at a position disposed generally one hundred eighty degrees from the position on the other surface of the driven cam engaged by the second brake roller; and wherein the channel in the first brake shoe element is disposed generally one hundred eighty degrees from the channel in the second brake shoe element in an assembled position of the first and the second brake shoe elements.

14. The apparatus of claim 6 wherein the first brake shoe element is defined further as including opposite end faces; and wherein the second brake shoe element is defined further as including opposite end faces, one of the end faces of the second brake shoe element being disposed in a generally coplanar relationship with respect to one of the end faces of the first brake shoe element and the opposite end face of the second brake shoe element being disposed in a generally coplanar relationship with respect to the other end face of the first brake shoe element in an assembled position of the first and the second brake shoe elements.

15. The apparatus of claim 1 wherein the first and the second brake shoe elements are each defined further as being generally cylindrically shaped and wherein the abutting ends of the first and the second brake shoe elements are disposed generally on a diametric centerline extending generally through the drive axis.

16. The apparatus of claim 6 wherein the first brake shoe element is defined further as including a surface formed on a portion of the outer peripheral surface of the first brake shoe element, the surface being spaced from the brake surface in the housing in the braking mode of the first brake shoe element and reducing the brake surface area on the first brake shoe element; and wherein the second brake shoe element is defined further as including a surface formed on a portion of the outer peripheral surface of the second brake shoe element, the surface being spaced from the brake surface in the housing in the braking mode of the second brake shoe element and reducing the brake surface area on the second brake shoe element.

17. The apparatus of claim 6 wherein the brake surface on the first brake shoe element extends over an angular distance less than one hundred eighty degrees; and wherein the brake surface on the second brake shoe element extends over an angular distance less than one hundred eighty degrees.

18. The apparatus of claim 1 wherein the means for rotatingly driving the first and the second brake shoe elements is defined further to include:

- an input drive shaft, having opposite ends;
- means journally supporting the input drive shaft for rotation about an axis substantially corresponding to the drive axis;
- means connected to the input drive shaft having a portion engageable with the first brake shoe element and a portion engageable with the second brake shoe element for drivingly rotating the brake shoe in a rotating position of the input drive shaft; and
- means for rotatingly driving the input drive shaft.

19. The apparatus of claim 18 wherein the means for rotatingly driving the first and the second brake shoe elements is defined further to include:

- a brake ring connected to the input drive shaft;
- a first flange connected to the brake ring and extending a distance generally axially therefrom, the first flange being engageable with the first brake shoe element; and
- a second flange connected to the brake ring and extending a distance generally axially therefrom, the second flange being engageable with the second brake shoe element.

20. An apparatus for moving a door member in an opening direction and in a closing direction, comprising:

- an output shaft rotatable about a drive axis;
- means having a portion forming an annular ball race, a portion of said means being rotatable about the drive axis;
- means for connecting the means forming the annular ball race to the output shaft;
- at least one ball rollingly disposed in the ball race, the portion of the means forming the ball race contactingly engaging each ball, the rotation of the portion of the means rotatable about the drive axis drivingly rotating the means for connecting the means forming the annular ball race thereby drivingly rotating the output shaft;
- a drive assembly connected to the means for forming the annular ball race for drivingly rotating a portion of said means about the drive axis in the first direction of rotation and in the second direction of rotation, thereby drivingly rotating the output shaft in the first direction of rotation and in the second direction of rotation; and
- a door member connected to the output shaft and being movable in an opening direction in response to the output shaft being rotated in the first direction of rotation and being movable in a closing direction in response to the output shaft being rotated in the second direction of rotation.

21. The apparatus of claim 20 wherein the means forming the annular ball race is defined further to include:

a fixed member having an annular fixed bearing surface formed on a portion thereof, the fixed bearing surface contactingly engaging each ball;

a driving member, having an annular bearing surface formed thereon, the driving member bearing surface contactingly engaging each ball and the driving member being rotatable about the drive axis;

a driven member connected to the output shaft, having an annular bearing surface formed thereon, the driven member bearing surface contactingly engaging each ball, and the driven member bearing surface, the driving member bearing surface and the fixed member bearing surface cooperating to form the annular bearing race, the driven member being drivingly rotated via the contacting engagement between the driven member bearing surface and each ball in a rotating position of the driving member; and means for rotatingly driving the driven member.

22. The apparatus of claim 21 defined further to include:

means biasingly engaging the driven member biasingly maintaining the contacting engagement and placing a predetermined axial, normal force between the driven member bearing surface and each ball.

23. The apparatus of claim 19 defined further to include:

means for supporting the fixed member in a stationary position.

24. The apparatus of claim 19 wherein the driving member is defined further as having a first and a second bearing surface formed thereon.

25. An apparatus for moving a door member in an opening direction and in a closing direction, comprising:

a housing having a brake surface formed in a portion thereof;

a brake shoe having a brake surface engageable with the brake surface in the housing in a braking mode, the brake shoe comprising:

a first brake shoe element having a brake surface formed on a portion thereof engageable with the housing brake surface in the braking mode; and a second brake shoe element having a brake surface formed on a portion thereof engageable with the housing brake surface in the braking mode, the brake surfaces on the first and the second brake shoe element providing the brake surface of the brake shoe;

means having a portion forming an annular ball race, a portion of said means being rotatable about a drive axis and a portion of said means being engageable with the first brake shoe element and the second brake shoe element for rotatingly driving the first and the second brake shoe elements in a first direction of rotation and in a second direction of rotation about the drive axis in a driving mode;

at least one ball rollingly disposed in the ball race, the portion of the means forming the ball race contactingly engaging each ball, the rotation of the portion of the means rotatable about the drive axis drivingly rotating the portion of the means forming the ball race connected to the first and the second brake shoe elements via each ball and the portions contacting each ball thereby drivingly rotating the first and the second brake shoe elements;

a drive assembly connected to the means for forming the annular ball race for drivingly rotating a portion of said means about the drive axis in the first direction of rotation and in the second direction of rotation;

an output shaft having a portion disposed between the first and the second brake shoe elements;

means disposed between the first and the second brake shoe elements and the output shaft, the first and the second brake shoe elements engaging the output shaft via said means for rotatingly driving the output shaft in the first direction of rotation and in the second direction of rotation in the driving mode, and the output shaft applying a force to the first and the second brake shoe elements via said means for positioning the first and the second brake shoe elements in the braking mode in response to a force applied to the output shaft; and a door member connected to the output shaft and being movable in an opening direction in response to the output shaft being rotated in the first direction of rotation and being movable in a closing direction in response to the output shaft being rotated in the second direction of rotation.

26. An apparatus for moving a door member in an opening direction and in a closing direction, comprising:

a housing having a brake surface formed in a portion thereof;

a brake shoe having a brake surface engageable with the brake surface in the housing in a braking mode, the brake shoe comprising:

a first brake shoe element having a brake surface formed on a portion thereof engageable with the housing brake surface in a braking mode, the first brake shoe element having an outer peripheral surface, opposite end faces and a recess formed in one end face thereof extending a distance axially therein intersecting a portion of the outer peripheral surface thereof and forming a contact surface in the first brake shoe element; and a second brake shoe having a brake surface formed on a portion thereof engageable with the housing brake surface in the braking mode, the brake surfaces on the first and the second brake shoe elements providing the brake surface of the brake shoe, the second brake shoe element having an outer peripheral surface, opposite end faces and a recess formed in one of the end faces extending a distance axially therein intersecting a portion of the outer peripheral surface thereof and forming a contact surface in the second brake shoe element;

means engageable with the first brake shoe element and the second brake shoe element for rotatingly driving the first and the second brake shoe elements in a first direction of rotation nd in a second direction of rotation about a drive axis in a driving mode, said means being engageable with the contact surface formed in the first brake shoe element and being engageable with the contact surface formed in the second brake shoe element;

an output shaft having a portion disposed between the first brake shoe element and the second brake shoe element;

means disposed between the first and the second brake shoe elements and the output shaft, the first and the second brake shoe elements engaging the output shaft via said means for rotatingly driving the output shaft in the first direction of rotation and in the second direction of rotation in the driving mode, and the output shaft applying a force to the first and the second brake shoe elements via said means for positioning the first and the second brake shoe elements in the braking mode in response to a force applied to the output shaft; and a door member connected to the output shaft and being movable in an opening direction in response to the output shaft being rotated in the first direction of rotation and being movable in a closing direction in response to the output shaft being rotated in the second direction of rotation.

* * * * *

UNITED STATES PATENT AND TRADEMARK OFFICE

CERTIFICATE OF CORRECTION

PATENT NO. : 4,245,728

DATED : January 20, 1981

INVENTOR(S) : Riza E. Murteza

It is certified that error appears in the above—identified patent and that said Letters Patent is hereby corrected as shown below:

In column 8, line 1, the equation "$n_x = n_x (i) + n_y (1-i)$" should be --$n_x = n_x (i) + n_y (1-i)$--.

Signed and Sealed this

*Twenty-sixth* Day of *January 1982*

[SEAL]

*Attest:*

GERALD J. MOSSINGHOFF

*Attesting Officer*

*Commissioner of Patents and Trademarks*